US009229219B2

(12) United States Patent
Matsushita et al.

(10) Patent No.: US 9,229,219 B2
(45) Date of Patent: Jan. 5, 2016

(54) OPTICAL FILTER, OPTICAL FILTER MODULE, SPECTROMETRIC INSTRUMENT, AND OPTICAL INSTRUMENT

(71) Applicant: Seiko Epson Corporation, Tokyo (JP)

(72) Inventors: Tomonori Matsushita, Chino (JP); Tatsuo Urushidani, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/325,923

(22) Filed: Jul. 8, 2014

(65) Prior Publication Data

US 2014/0320854 A1    Oct. 30, 2014

Related U.S. Application Data

(63) Continuation of application No. 13/211,794, filed on Aug. 17, 2011, now Pat. No. 8,817,267.

(30) Foreign Application Priority Data

Aug. 20, 2010  (JP) .................................. 2010-184803

(51) Int. Cl.
*G01B 9/02* (2006.01)
*G02B 26/00* (2006.01)
*G01J 3/26* (2006.01)

(52) U.S. Cl.
CPC *G02B 26/001* (2013.01); *G01J 3/26* (2013.01)

(58) Field of Classification Search
CPC .................................. G02B 5/28; G02B 5/284
USPC .................................................. 356/454, 519
See application file for complete search history.

(56) References Cited

U.S. PATENT DOCUMENTS

| 5,589,689 | A | 12/1996 | Koskinen |
| 6,013,912 | A | 1/2000 | Pautrat et al. |
| 6,301,042 | B1 | 10/2001 | Pelekhaty |
| 6,356,689 | B1 | 3/2002 | Greywall |
| 6,438,149 | B1 | 8/2002 | Tayebati et al. |
| 6,584,126 | B2 | 6/2003 | Wang et al. |
| 6,590,710 | B2 | 7/2003 | Hara et al. |
| 6,645,784 | B2 | 11/2003 | Tayebati et al. |
| 6,813,291 | B2 | 11/2004 | Wang et al. |
| 7,106,514 | B2 | 9/2006 | Murata et al. |

(Continued)

FOREIGN PATENT DOCUMENTS

| EP | 0929830 | 4/1998 |
| JP | 01-300202 | 12/1989 |

(Continued)

*Primary Examiner* — Jonathan Hansen
(74) *Attorney, Agent, or Firm* — Harness, Dickey & Pierce, P.L.C.

(57) ABSTRACT

An Etalon filter includes a first substrate, a second substrate which faces the first substrate, a first optical film which is provided on the first substrate, and a second optical film which is provided on the second substrate to face the first optical film. The reflective characteristic of the first optical film determined by the reflectance of light of each wavelength in a reflective band is different from the reflective characteristic of the second optical film determined by the reflectance of light of each wavelength in the reflective band. The first optical film can have a reflective characteristic with a first wavelength $\lambda 1$ as a center wavelength, and the second optical film can have a reflective characteristic with a second wavelength $\lambda 2$ different from the first wavelength as a center wavelength.

13 Claims, 9 Drawing Sheets

(56) References Cited

U.S. PATENT DOCUMENTS

| | | |
|---|---|---|
| 7,286,244 B2 | 10/2007 | Murata |
| 7,301,703 B2 | 11/2007 | Nakamura et al. |
| 7,304,800 B2 | 12/2007 | Nakamura et al. |
| 7,385,704 B2 * | 6/2008 | Mestha .............. G01J 3/26 356/454 |
| 7,515,325 B2 | 4/2009 | Nakamura |
| 7,525,713 B2 | 4/2009 | Nakamura |
| 7,733,495 B2 | 6/2010 | Suzuki et al. |
| 2003/0116711 A1 | 6/2003 | Hara et al. |
| 2004/0057473 A1 | 3/2004 | Wang et al. |
| 2004/0218251 A1 | 11/2004 | Piehl et al. |
| 2005/0088657 A1 | 4/2005 | Sugawara et al. |
| 2006/0018348 A1 | 1/2006 | Przybyla et al. |
| 2006/0082863 A1 | 4/2006 | Piehl et al. |
| 2006/0221450 A1 | 10/2006 | Wang et al. |
| 2007/0148760 A1 * | 6/2007 | Klesel .............. G01J 1/42 435/287.2 |
| 2010/0142067 A1 | 6/2010 | Hanamura et al. |
| 2010/0214644 A1 | 8/2010 | Cheong et al. |
| 2010/0267920 A1 * | 10/2010 | Smith .............. G02B 26/001 528/26 |
| 2012/0044492 A1 | 2/2012 | Matsushita et al. |
| 2012/0268809 A1 * | 10/2012 | Guo .............. G02F 1/216 359/359 |
| 2014/0320854 A1 | 10/2014 | Matsushita et al. |

FOREIGN PATENT DOCUMENTS

| | | |
|---|---|---|
| JP | 09-043051 | 2/1997 |
| JP | 10-206228 | 8/1998 |
| JP | 11-142752 | 5/1999 |
| JP | 2001-066457 A | 3/2001 |
| JP | 2001-296483 A | 10/2001 |
| JP | 2001-525075 | 12/2001 |
| JP | 2002-500446 A | 1/2002 |
| JP | 2002-174721 | 6/2002 |
| JP | 2002-243937 | 8/2002 |
| JP | 2003-264505 A | 9/2003 |
| JP | 2004-334201 A | 11/2004 |
| JP | 2005-099206 A | 4/2005 |
| JP | 2005-106753 A | 4/2005 |
| JP | 2005-127943 | 5/2005 |
| JP | 2005-165067 A | 6/2005 |
| JP | 2006-023606 | 1/2006 |
| JP | 2007-219483 A | 8/2007 |
| JP | 2008-129504 A | 6/2008 |
| JP | 2008-134388 | 6/2008 |
| JP | 2009-204381 | 9/2009 |
| JP | 2009-210521 | 9/2009 |
| JP | 2009-282540 A | 12/2009 |
| JP | 2010-139552 A | 6/2010 |
| JP | 2010-198018 A | 9/2010 |
| JP | 5625614 B2 | 11/2014 |

* cited by examiner

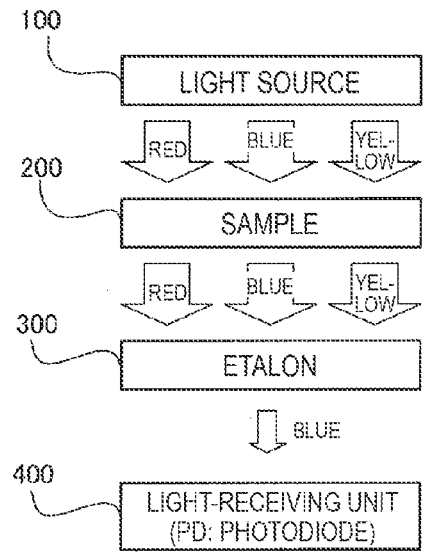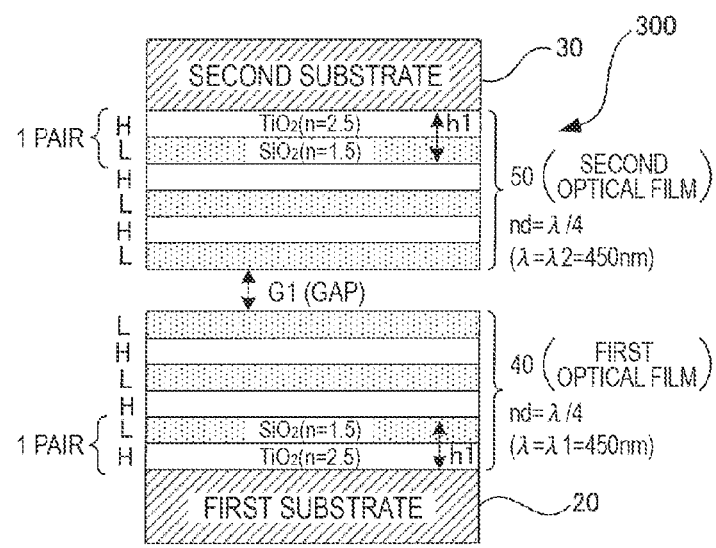
FIG. 3A
FIG. 3B
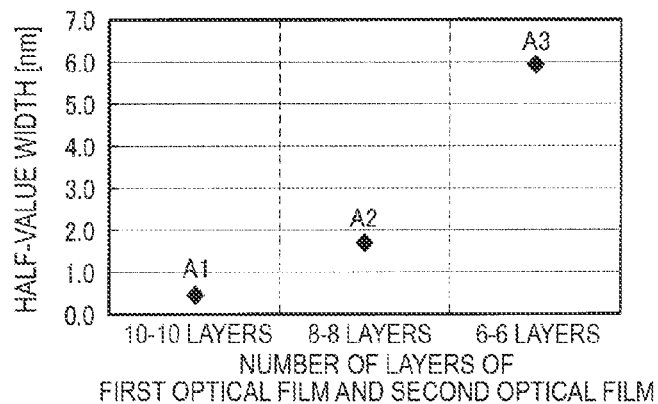
FIG. 3C
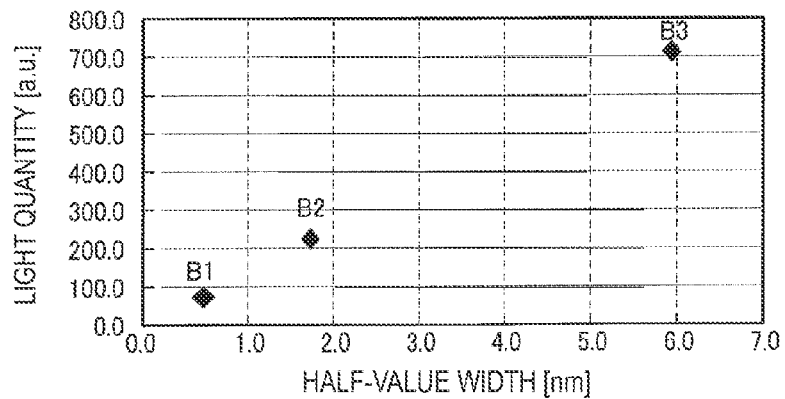
FIG. 3D

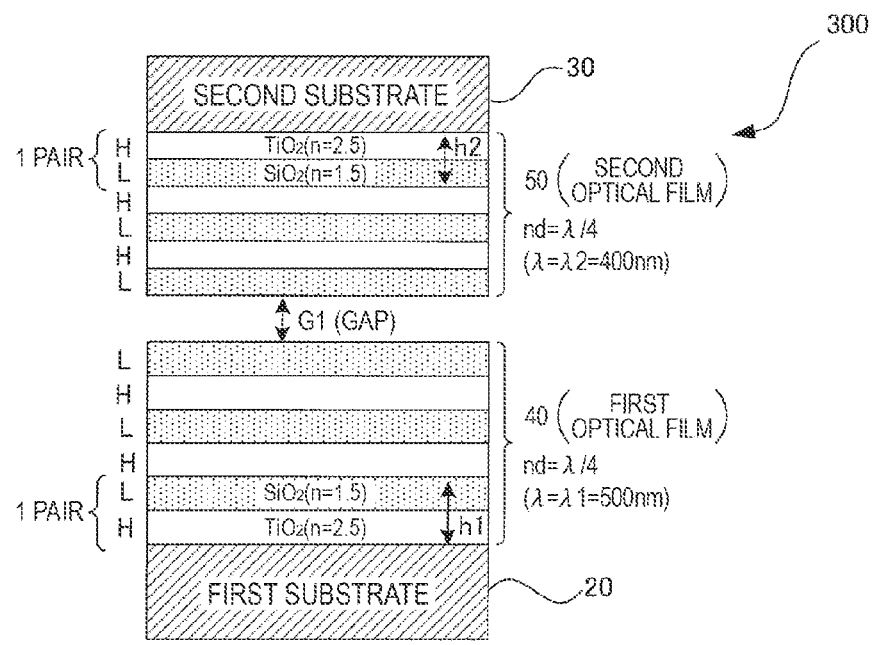
FIG. 4A
| CENTER WAVELENGTH λ1 [nm] OF FIRST OPTICAL FILM | CENTER WAVELENGTH λ2 [nm] OF SECOND OPTICAL FILM | PEAK WAVELENGTH [nm] | TRANS-MITTANCE [%] | HALF-VALUE WIDTH [nm] | LIGHT QUANTITY RATIO |
|---|---|---|---|---|---|
| 450 | 450 | 460.0 | 93.1 | 1.6 | 1.0 |
| 500 | 400 | 460.0 | 82.9 | 2.6 | 1.36 |
FIG. 4B
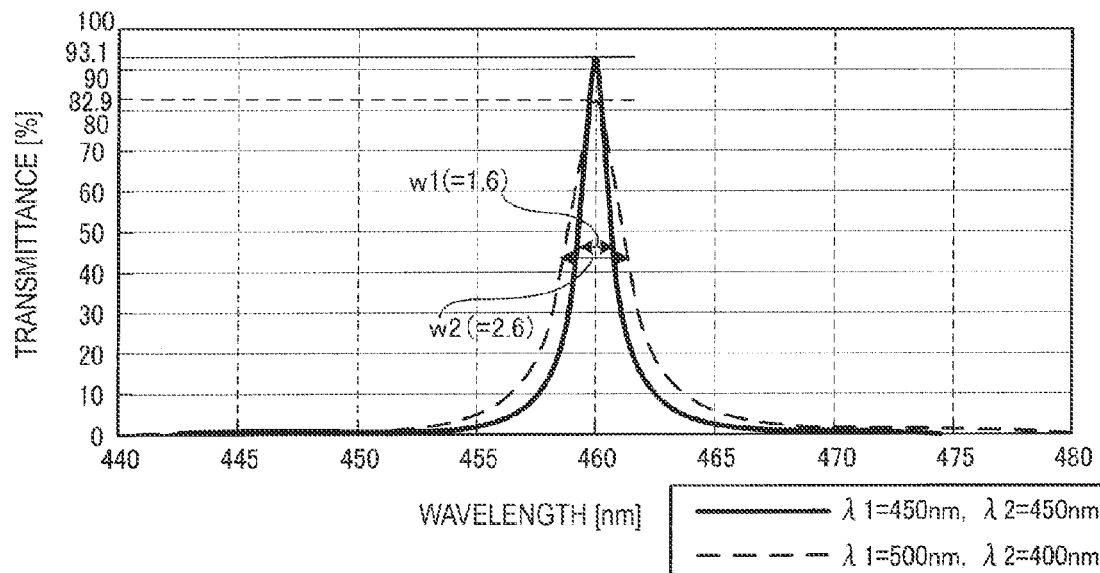
FIG. 4C

OPTICAL FILTER, OPTICAL FILTER MODULE, SPECTROMETRIC INSTRUMENT, AND OPTICAL INSTRUMENT

CROSS-REFERENCE TO RELATED APPLICATIONS

This application is a continuation of U.S. application Ser. No. 13/211,794 filed Aug. 17, 2011. This application claims the benefit of Japanese Patent Application No. 2011-184803, filed Aug. 20, 2010. The disclosures of the above applications are incorporated herein by reference.

BACKGROUND

1. Technical Field

The present invention relates to an optical filter, an optical filter module, a spectrometric instrument, an optical instrument, and the like.

2. Related Art

An optical filter, such as an interference filter, is heretofore used in a spectrometric instrument or the like. As one form of the interference filter, a Fabry-Perot Etalon interference filter (hereinafter, referred to an Etalon filter or simply referred to as an Etalon) is known. For example, JP-A-11-142752 describes a transparent wavelength-variable interference filter (hereinafter, referred to as a variable gap Etalon filter or simply referred to as a variable gap Etalon) with a variable transparent wavelength. This interference filter includes a pair of substrates, and optical films (reflecting films) which are formed on the pair of substrates to face each other at a regular-interval gap. In this interference filter, the size of the gap between the optical films (reflecting films) changes due to external force to variably control the transparent wavelength.

In order to realize an Etalon having the desired characteristics, it is necessary to appropriately design optical films having a transmissive characteristic and a reflective characteristic with respect to light in a desired wavelength band. In general, many optical films have a structure in which the thickness of an optical film with respect to the wavelength $\lambda$ of light is $\lambda/4$, and the optical films having the same structure are arranged to face each other and used in pairs. In order to realize more distinctive optical characteristics, the thickness of each optical film may have a value other than $\lambda/4$ (for example, JP-A-2008-129504). In JP-A-2008-129504, the optical films having the same structure are used in pairs.

In the Etalon filter serving as an optical filter, the filter characteristics (reflective characteristic, transmissive characteristic, and the like) are determined by the reflectance of the optical film. When the reflectance of the optical film is high, the half-value width becomes small, and when the reflectance of the optical film is low, the half-value width becomes large. By controlling the reflectance of the optical film, it is possible to control the filter characteristics of the Etalon filter. If the half-value width of the Etalon is small, only a desired wavelength is extracted. For this reason, when the Etalon is used as a spectrometric instrument, it is possible to increase measurement precision. However, if the half-value width of the Etalon is small, since the quantity of light which transmits the Etalon is lowered, the light-receiving unit may not easily detect light. Meanwhile, if the half-value width of the Etalon is large, the quantity of light which transmits the Etalon increases. In this case, the light-receiving unit easily detects light and also detects light other than a desired wavelength. That is, the wavelength resolution of the Etalon is lowered. When designing the Etalon, it is necessary that each of the "half-value width" and the "transmitted light quantity" satisfies a desired reference. Incidentally, for example, when the wavelength band of light to be used spans a wide wavelength range, it may become difficult to design the optical film.

As described above, the factor which determines the half-value width of the Etalon is the reflectance of an optical film. As a general method of controlling the reflectance of the optical film, a method is known which changes the material of the optical film or forms an optical film using a multilayer film and changes the number of layers in the multilayer film. However, when the material changes, there is a limit on the types of usable materials. When the number of layers of the optical film changes, the reflectance has only a discrete value with respect to the number of layers, and accordingly, it may be impossible to design an optical film such that a target reflectance, that is, a target half-value width or transmitted light quantity is obtained.

That is, when the number of layers changes, the value of the half-value width changes discretely, and a value other than the discrete value may not be realized only with a change in the number of layers. For example, when a specification is satisfied such that a half-value width is 3±0.5 nm, if discrete reflectance obtained with a change in the number of layers does not fall within the desired range in an optical film made of a predetermined material, it becomes difficult to appropriately design the optical film.

SUMMARY

An advantage of some aspects of the invention is to facilitate, for example, design for the characteristics of an optical filter.

(1) According to an aspect of the invention, an optical filter includes a first substrate, a second substrate which faces the first substrate, a first optical film which is provided on the first substrate, and a second optical film which is provided on the second substrate to face the first optical film. The reflective characteristic of the first optical film determined by the reflectance of light of each wavelength in the reflective band of light is different from the reflective characteristic of the second optical film determined by the reflectance of light of each wavelength in the reflective band.

Although in the related art, optical films are designed assuming that a first optical film and a second optical film which form a mirror have the same reflective characteristic, in this aspect, the reflective characteristic of the first optical film is intentionally different from the reflective characteristic of the second optical film. That is, the reflective characteristic of the first optical film is asymmetrical to the reflective characteristic of the second optical film. Therefore, it is possible to realize optical filter characteristics which could not be obtained by a combination of optical films having the same characteristic.

For example, it becomes possible to design optical films in various forms, and it becomes easy to design optical films which satisfy a target half-value width or transmitted light quantity. That is, it is possible to more easily realize spectral characteristics, which are required for the optical filter, compared to the related art, thereby reducing a burden in designing the optical filter. Specifically, the above-described "reflective characteristic of the optical film" is the "reflective characteristic determined by the reflectance of light of each wavelength in the reflective band of the optical film".

(2) In the optical filter according to the aspect of the invention, the first center wavelength of the first optical film corresponding to the peak reflectance of light may be set to a value different from the second center wavelength of the second optical film corresponding to the peak reflectance of light.

With this configuration, when the center wavelength of the first optical film alone is the first center wavelength, and the center wavelength of the second optical film alone is the second center wavelength, the first center wavelength is set to a value different from the second center wavelength. Specifically, the first center wavelength is a wavelength corresponding to the maximum reflectance of light in the first optical film (the peak reflectance of light), and the second center wavelength is a wavelength corresponding to the maximum reflectance of light in the second optical film (the peak reflectance of light).

The center wavelengths of the optical films are different from each other, such that the reflective characteristic of the first optical film is asymmetrical to the reflective characteristic of the second optical film, making it easy to realize an optical filter which satisfies both the target half-value width and transmitted light quantity.

As a method of making (shifting) the center wavelengths of the optical film different from each other, for example, a method can be used in which the optical films are formed of dielectric multilayer films using the same material, and the number of layers differs between the optical films. For example, a method can be used in which the number of first optical films is the same as the number of second optical films, and the thickness of each film laminated differs between the first optical film and the second optical film. A method can also be used in which the number of layers and the thickness of each film differ between the first optical film and the second optical film. A method can also be used in which the materials for forming the optical films are different from each other. A method can also be used in which the structures of the optical films are different from each other.

(3) In the optical filter according to the aspect of the invention, when the first center wavelength of the first optical film is $\lambda 1$, the second center wavelength of the second optical film is $\lambda 2$, and the center wavelength in the spectral band of the optical filter is $\lambda 3$, $\lambda 1 < \lambda 3 < \lambda 2$ may be established.

With this configuration, the center wavelength $\lambda 3$ in the spectral band of the optical filter (the center wavelength of the optical filter) is set in the wavelength band between the center wavelengths of the optical films, that is, in the wavelength band of $\lambda 1$ to $\lambda 2$. When the optical filter is, for example, a light-transmissive filter, the center wavelength $\lambda 3$ is a wavelength corresponding to peak transmittance in a light-transmissive band (that is, the spectral band of the optical filter which is realized at that time).

The spectral characteristics of the optical filter are determined depending on the product of the reflectances of the first optical film and the second optical film at the center wavelength of the optical filter. If the product of the reflectances of the optical films has an excessively small value, the half-value width becomes excessively large, making it impossible to secure desired optical filter characteristics, that is, wavelength resolution. With this configuration, the center wavelength $\lambda 3$ of the optical filter is set in the wavelength band between the wavelength $\lambda 1$ corresponding to the peak reflectance of the first optical film and the wavelength $\lambda 2$ corresponding to the peak reflectance of the second optical film. Thus, the reflectance of each optical film at the wavelength $\lambda 3$ can be equal to or greater than the minimum. Therefore, the product of the reflectances of the optical films is prevented from becoming excessively small.

(4) In the optical filter according to the aspect of the invention, when the minimum value of the reflectance of the first optical film in the spectral band of the optical filter is $\alpha 1$, and the minimum value of the reflectance of the second optical film in the spectral band of the optical filter is $\alpha 2$, $\alpha 1 \cdot \alpha 2 \geq 0.64$ may be established.

When the minimum value of the reflectance of the first optical film in the spectral band is $\alpha 1$, and the minimum value of the reflectance of the second optical film is $\alpha 2$, the value of $\alpha 1 \cdot \alpha 2$ (the product of $\alpha 1$ and $\alpha 2$) to be designed is appropriately determined depending on the design conditions or the like, and accordingly, it is difficult to define the reference uniformly. Meanwhile, from experience of design for an optical filter, for example, if $\alpha 1 = 0.8$ and $\alpha 2 = 0.8$, an optical filter can be designed, and it is thus considered that the reflectances should have these values to the minimum. That is, it is considered that $\alpha 1 \cdot \alpha 2$ should be equal to or greater than 0.64 as the reference from experience. Therefore, with this configuration, the reflectances of the first optical film and the second optical film are set such that $\alpha 1 \cdot \alpha 2 \geq 0.64$ is established.

(5) In the optical filter according to the aspect of the invention, when the center wavelength in the spectral band of the first optical film is identical to the center wavelength in the spectral band of the second optical film, and the identical center wavelength is a common center wavelength, the reflectance of light of the common center wavelength in the first optical film may be set to first reflectance, and the reflectance of light of the common center wavelength in the second optical film may be set to second reflectance different from the first reflectance.

With this configuration, while the center wavelength of the first optical film is identical to the center wavelength of the second optical film, the reflectances of the optical films at the center wavelength (common center wavelength) are set to different values. As a method of making the reflectance at the common center wavelength differ between the first optical film and the second optical film, for example, a method can be used in which the optical films are formed of dielectric multilayer films using the same material, and the number of layers differs between the optical films. A method can also be used in which the materials for forming the optical films are different from each other. A method can also be used in which the structures of the optical films are different from each other.

(6) In the optical filter according to the aspect of the invention, the first optical film may be a first laminated film which is formed by laminating m (where m is an integer equal to or greater than 1) pairs of layers, each having a set of a first material film and a second material film, and the second optical film may be a second laminated film which is formed by laminating n (where n is an integer equal to or greater than 2, and n≠m) pairs of layers, each having a set of the first material film and the second material film.

With this configuration, the first optical film and the second optical film are formed of laminated films, and the number of pairs of layers differs between the first optical film and the second optical film, such that the reflective characteristic of the first optical film is asymmetrical to the reflective characteristic of the second optical film. For example, the first material film (upper layer: small refractive index) and the second material film (lower layer: large refractive index) having different refractive indexes are provided as a set (one pair) of layers, and the number of sets of layers, that is, the number of pairs differs between the first optical film and the second optical film. Varying the number of layers (the number of pairs) in the laminated film can be achieved by slightly varying the manufacturing process and is easily realized.

(7) In the optical filter according to the aspect of the invention, the first optical film may be a first laminated film which is formed by laminating m (where m is an integer equal to or greater than 1) pairs of layers, each having a set of a first material film and a second material film, and the second optical film may be a second laminated film which is formed by laminating m pairs of layers, each having a set of the first material film and the second material film, the thickness of a set of layers being different from the thickness of a set of layers in the first optical film.

With this configuration, the first optical film and the second optical film are formed of laminated films, and while the number of pairs of layers is the same, the thickness of a set of layers having the first material layer and the second material layer differs between the optical films, such that the reflective characteristic of the first optical film is asymmetrical to the reflective characteristic of the second optical film. For example, the first material film (upper layer: small refractive index) and the second material film (lower layer: large refractive index) having different refractive indexes are provided as a set (one pair) of layers, and the thickness of at least one of the first material film and the second material film varies between the first optical film and the second optical film, thereby providing a difference in the thickness of a set of layers. The above configuration of the optical films can be achieved by slightly varying the manufacturing process and is easily realized.

(8) In the optical filter according to the aspect of the invention, the first optical film may be a first laminated film which is formed by laminating m (where m is an integer equal to or greater than 1) pairs of layers, each having a set of a first material film and a second material film, and the second optical film may be a second laminated film which is formed by laminating n (where n is an integer equal to or greater than 2, and n≠m) pairs of layers, each having a set of the first material film and the second material film, the thickness of a set of layers being different from the thickness of a set of layers in the first optical film.

With this configuration, the first optical film and the second optical film are formed of laminated films, the number of pairs of layers differs between the optical films, and the thickness of a set of layers having the first material layer and the second material layer differs between the optical films, such that the reflective characteristic of the first optical film is asymmetrical to the reflective characteristic of the second optical film.

For example, the first material film (upper layer: small refractive index) and the second material film (lower layer: large refractive index) having different refractive indexes are provided as a set (one pair) of layers, and the number of sets of layers, that is, the number of pairs differs between the first optical film and the second optical film. The thickness of at least one of the first material film and the second material film varies between the first optical film and the second optical film, thereby providing a difference in the thickness of a set of layers. With the adjustment of the number of layers (the number of pairs) in the laminated film and the adjustment of the thickness of a set of layers, it is possible to control the reflective characteristic of the optical film in more various forms. The above configuration of the optical films can be achieved by slightly varying the manufacturing process and is easily realized.

(9) In the optical filter according to the aspect of the invention, a material which forms the first optical film may be different from a material which forms the second optical film.

With this configuration, the material differs between the optical films, such that the reflective characteristic of the first optical film is asymmetrical to the reflective characteristic of the second optical film. With a combination of optical films using different materials, it is possible to design an optical filter having more various characteristics. For example, a case where a dielectric multilayer film is used as the first optical film, and a metal film (Ag simplex film or Ag alloy film) mainly consisting of Ag (silver) is used as the second optical film is taken into consideration. In this case, it is possible to realize optical filter characteristics which could not be obtained by a combination of the same materials.

(10) In the optical filter according to the aspect of the invention, the structure of the first optical film may be different from the structure of the second optical film.

With this configuration, the structure differs between the optical films, such that the reflective characteristic of the first optical film is asymmetrical to the reflective characteristic of the second optical film. For example, there may be a case where the first optical film is a laminated film with a set of layers of a first material layer and a second material layer as a constituent unit, and the second optical film is a laminated film with a set of layers of the first material layer, the second material layer, and a third material layer as a constituent unit. While the molecular formulae of the materials which are used for the optical films are the same, a way of bonding atoms or groups in each compound changes by the chemical and physical actions of a catalyst or the like. Thus, the compounds (isomers) have the same molecular formula but are different in the structural formula. This also corresponds to a case where the structures of the optical film are different from each other.

(11) In the optical filter according to the aspect of the invention, the optical filter may be a variable gap Etalon filter, the first substrate may be a fixed substrate having a first electrode, the second substrate may be a movable substrate having a second electrode, and the gap between the first optical film and the second optical film may be variably controlled by electrostatic force which is generated between the first electrode and the second electrode, such that the spectral band is switched within a desired wavelength band.

The variable gap Etalon filter is a convenient wavelength-variable filter which uses the principle of a Fabry-Perot interferometer, has a simple configuration, and is suitable for reduction in size and lower cost. The gap between the first optical film and the second optical film can be controlled with satisfactory precision by electrostatic force which is generated between the first electrode and the second electrode. With this configuration, the reflective characteristics of a pair of optical films which are used in the variable gap Etalon filter and function as a mirror are asymmetrized. Therefore, design of the variable gap Etalon filter is facilitated.

(12) In the optical filter according to the aspect of the invention, the first electrode may be formed around the first optical film in plan view when viewed from the thickness direction of the first substrate, and the second electrode may be formed around the second optical film in plan view when viewed from the thickness direction of the second substrate.

With this configuration, the first electrode and the second electrode of a first wavelength-variable band-pass filter are respectively formed around the first optical film and the second optical film. Since the optical films and the electrodes do not overlap each other, the electrodes do not affect the light-reflective characteristics (or light-transmissive characteristics) of the optical films. Therefore, design of the optical films is not complicated.

(13) In the optical filter according to the aspect of the invention, the thickness of the second optical film provided on the second substrate serving as the movable substrate may be smaller than the thickness of the first optical film provided on the first substrate serving as the fixed substrate.

Since the second substrate is a movable substrate, it is important that a movable unit (diaphragm) is appropriately bent (deformed) in accordance with electrostatic force which is generated between the first electrode and the second electrode. Thus, with this configuration, the thickness of the second optical film provided on the second substrate serving as the movable substrate is set to be smaller than the thickness of the first optical film provided on the first substrate serving as the fixed substrate. Therefore, stress by the second optical film in the second substrate serving as the movable substrate is reduced, making it easy to secure satisfactory bendability of the movable unit.

(14) According to another aspect of the invention, an optical filter module includes the above-described optical filter, and a light-receiving element which receives light having transmitted the optical filter.

The optical filter module can be used, for example, as a receiving unit (including a light-receiving optical system and a light-receiving element) of an optical communication device, and can be used, for example, as a light-receiving unit (including a light-receiving optical system and a light-receiving element) of a spectrometric instrument. With this configuration, a small and convenient optical filter module is realized.

(15) According to still another aspect of the invention, a spectrometric instrument includes the above-described optical filter, a light-receiving element which receives light having transmitted the optical filter, and a signal processing unit which performs given signal processing on the basis of signal processing based on a signal obtained from the light-receiving element.

With this configuration, it is possible to realize a small, lightweight, and convenient spectrometric instrument which has a simplified configuration. The signal processing unit performs predetermined signal processing on the basis of a signal (light-receiving signal) obtained from the light-receiving element and measures, for example, the spectrophotometric distribution of a sample. With the measurement of the spectrophotometric distribution, for example, it is possible to perform sample colorimetry, sample component analysis, or the like.

(16) According to yet another aspect of the invention, an optical instrument includes the above-described optical filter.

With this configuration, for example, a small, lightweight, and convenient optical instrument (for example, various sensors or optical communication application instrument) having a simplified configuration is realized.

BRIEF DESCRIPTION OF THE DRAWINGS

The invention will be described with reference to the accompanying drawings, wherein like numbers reference like elements.

FIGS. 3A to 3D are diagrams illustrating a specific example of design for optical films in an Etalon filter.

FIGS. 4A to 4C are diagrams illustrating an example where a mirror structure is used in which the thickness of a dielectric multilayer film differs between a first optical film and a second optical film.

DESCRIPTION OF EXEMPLARY EMBODIMENTS

Hereinafter, exemplary embodiments of the invention will be described in detail. The embodiments described below are not intended to unduly limit the content of the invention described in the appended claims, and it is not necessary that all the configuration described in the embodiments are essential as the means for resolution of the invention.

First Embodiment

Figure 1A:
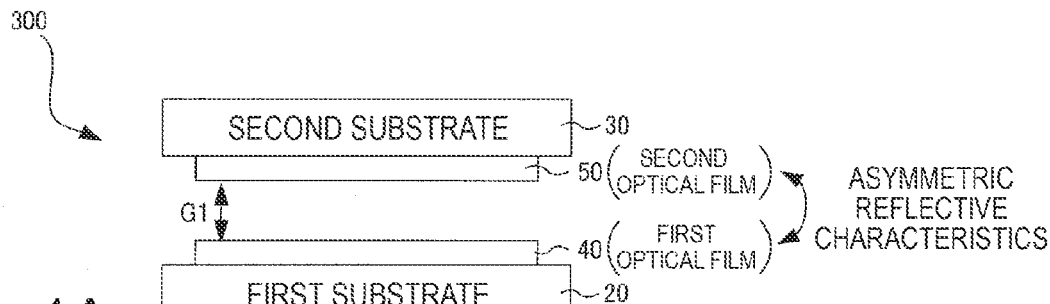
FIGS. 1A to 1D are diagrams showing an example of the reflective characteristics of a pair of optical films which are the constituent elements of an optical filter and an example of the spectral characteristics of an optical filter.

FIGS. 1A to 1D are diagrams showing an example of the reflective characteristics of a pair of optical films which are the constituent elements of an optical filter and an example of the spectral characteristics of an optical filter. As shown in FIG. 1A, an Etalon filter 300 has a first substrate 20 and a second substrate 30 which are held in parallel with each other, a first optical film 40 which is provided on the first substrate 20, and a second optical film 50 which is provided on the second substrate 30. The first substrate 20 and the second substrate are, for example, glass substrates which have transmissiveness with respect to light in a desired wavelength band.

The first optical film 40 and the second optical film 50 are formed to face each other at a predetermined gap G1. The first optical film 40 and the second optical film 50 have reflective characteristics and transmissive characteristics with respect to light in a desired wavelength band, and form a mirror in the Etalon filter 300. The first optical film can be also referred to as a first reflecting film, and the second optical film can be also referred to as a second reflecting film.

The gap G1 may be fixed or the gap G1 may be variable. The principle of the Etalon filter and the structure, operation, and the like of the variable gap Etalon will be described below.

In this embodiment, the reflective characteristic of the first optical film 40 is set to be different from the reflective characteristic of the second optical film 50. Specifically, the "reflective characteristic of the optical film" refers to the "reflective characteristic of the optical film determined by the reflectance of light of each wavelength in a reflective band".

As described above, although in the example of the related art, optical films are designed assuming that a first optical film and a second optical film which form a mirror have the same reflective characteristic, in this embodiment, the reflective characteristic of the first optical film 40 is intentionally different from the reflective characteristic of the second optical film 50.

That is, the reflective characteristic of the first optical film 40 is asymmetrical to the reflective characteristic of the second optical film 50. Thus, it is possible to realize optical filter characteristics which could not be obtained by a combination of optical films having the same characteristic. For example, optical films can be designed in various forms, and it becomes easy to design optical films which satisfy a target half-value width or transmitted light quantity. That is, it is possible to more easily realize the spectral characteristics which are required for the optical filter compared to the related art, thereby reducing a burden in designing the optical filter.

Figure 1B:
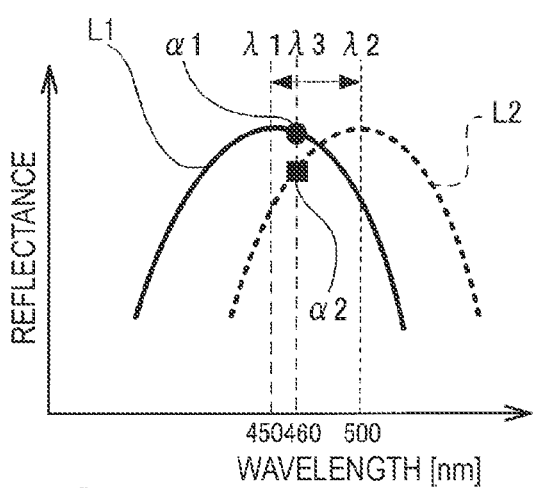

FIG. 1B shows an example of design of the reflective characteristic of each of the first optical film 40 and the second optical film 50. In FIG. 1B, a characteristic line L1 which represents the reflective characteristic of the first optical film 40 is indicated by a solid line, and a characteristic line L2 which represents the reflective characteristic of the second optical film 50 is indicated by a broken line. In the example shown in FIG. 1B, a first center wavelength $\lambda 1$ of the first optical film 40 corresponding to the peak reflectance is set to a value different from a second center wavelength $\lambda 2$ of the second optical film 50 corresponding to the peak reflectance. That is, in the example of FIG. 1B, the center wavelengths of the optical films are shifted by a predetermined wavelength. The center wavelength of the first optical film 40 alone is referred to as the first center wavelength $\lambda 1$, and the center wavelength of the second optical film 50 alone is referred to as the second center wavelength $\lambda 2$. Specifically, the first center wavelength $\lambda 1$ is a wavelength corresponding to the maximum reflectance (peak reflectance) of the first optical film 40, and the second center wavelength $\lambda 2$ is a wavelength corresponding to the maximum reflectance (peak reflectance) of the second optical film 50.

The center wavelengths ($\lambda 1$ and $\lambda 2$) of the optical films 40 and 50 are different from each other, that is, the reflective characteristic of the first optical film 40 is asymmetrical to the reflective characteristic of the second optical film 50, making it easy to realize the Etalon filter 300 which satisfies both the target half-value width and transmitted light quantity, for example. The relationship between the reflectance and the half-value width in the Etalon filter 300 and the relationship between the reflectance and the half-value width will be described below.

As a method of making (shifting) the center wavelengths ($\lambda 1$ and $\lambda 2$) of the optical films 40 and 50 different from each other, for example, a method can be used in which, while the number of layers is the same, the thickness of a layer to be laminated differs between the first optical film 40 and the second optical film 50. A method can also be used in which the materials for forming the optical films are different from each other. A method can also be used in which the structures of the optical films are different from each other.

In the example of FIG. 1B, when the center wavelength in the spectral band of the Etalon filter 300 (the center wavelength of the Etalon filter 300) is $\lambda 3$, it is preferable that $\lambda 1 < \lambda 3 < \lambda 2$ is established. In the example of FIG. 1B, $\lambda 1$ is set to 450 nm, $\lambda 2$ is set to 500 nm, and $\lambda 3$ is set to 460 nm. At this time, as shown in FIG. 1D, the light-transmissive characteristic in the spectral band has a half-value width W at the center wavelength $\lambda 3$ (430 nm).

The spectral characteristics of the Etalon filter 300 are determined depending on the reflective characteristics of the first optical film 40 and the second optical film 50. FIG. 1D shows an example of the spectral characteristics of the Etalon filter 300. In the example shown in FIG. 1D, the spectral band of the Etalon filter 300 is set to a wavelength band of 450 nm to 470 nm. The Etalon filter 300 shows the maximum transmittance at the wavelength 460 nm. The wavelength (the wavelength having the peak transmittance) corresponding to the peak transmittance is the center wavelength $\lambda 3$ in the spectral band of the Etalon filter 300.

The reason why the description "the center wavelength in the spectral band" is used is as follows. That is, in the case of a wavelength-variable filter, a plurality of spectral bands can be realized, and a center wavelength is present in each spectral band. In other words, in the case of a wavelength-variable filter, there are a plurality of center wavelengths of the Etalon filter 300. From this viewpoint, the accurate description "the center wavelength $\lambda 3$ in the spectral band of the Etalon filter 300" is used in the sense of "the center wavelength in the spectral band which is realized in the Etalon filter 300". However, in this specification, there is a case where the center wavelength $\lambda 3$ of the optical filter is simply described.

The condition that $\lambda 1 < \lambda 3 < \lambda 2$ is established means that the center wavelength $\lambda 3$ in the spectral band of the Etalon filter 300 is set in the wavelength band between the center wavelengths of the optical films 40 and 50, that is, in the wavelength band of $\lambda 1$ to $\lambda 2$. Thus, the reflectance of each of the optical films 40 and 50 at the wavelength $\lambda 3$ can be equal to or greater than the minimum.

That is, the spectral characteristics of the Etalon filter 300 are determined depending on the product of the reflectances of the first optical film 40 and the second optical film 50 at each wavelength in the spectral band of the optical filter. If the product of the reflectances of the optical films 40 and 50 has an excessively small value, the half-value width becomes excessively large, making it impossible to secure the desired characteristics (wavelength resolution or the like) of the optical filter.

In the example of FIG. 1B, the minimum value of the reflectance in the spectral band of the first optical film 40 is $\alpha 1$, and the minimum value of the reflectance in the spectral band of the second optical film 50 is $\alpha 2$. When $\lambda 1 < \lambda 3 < \lambda 2$ is established, as shown in FIG. 1B, the reflectances $\alpha 1$ and $\alpha 2$ of the optical films 40 and 50 can be equal to or greater than the minimum. That is, the product ($\alpha 1 \cdot \lambda 2$) of the reflectances of the optical films 40 and 50 is prevented from becoming excessively small. Therefore, it is possible to obtain the desired characteristics (resolution) of the Etalon filter 300.

Figure 1C:
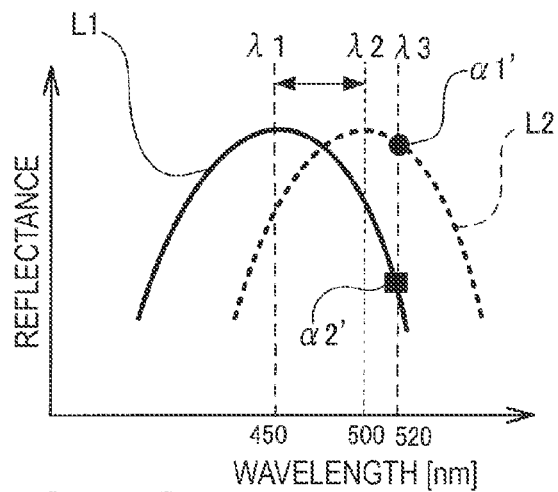
Figure 1D:
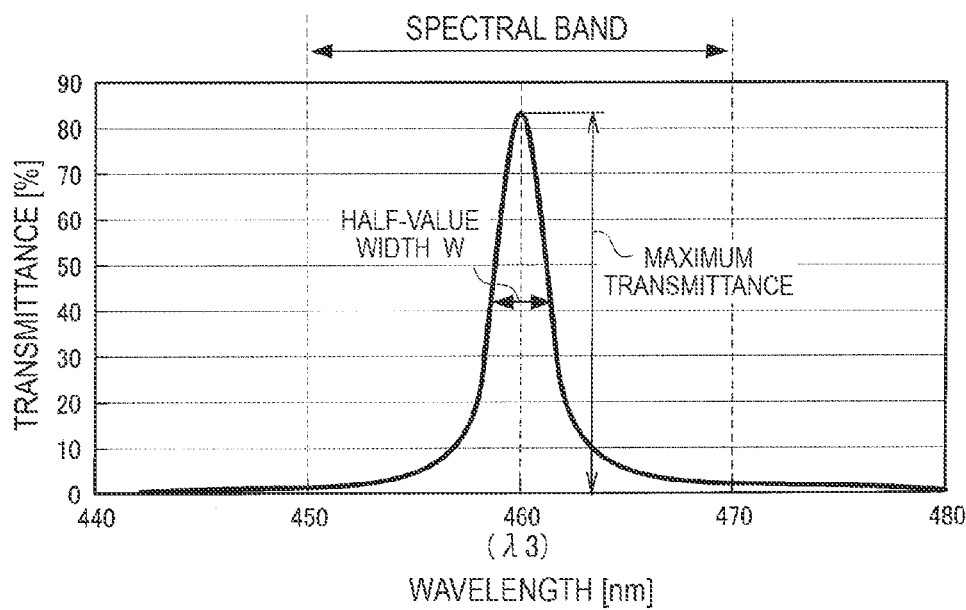

FIG. 1C shows a comparative example. In FIG. 1C, $\lambda 3$ is set to 520 nm, and $\lambda 1 < \lambda 2 < \lambda 3$ is obtained. In this case, the center wavelength $\lambda 1$ of the first optical film 40 and the center wavelength $\lambda 3$ of the Etalon filter 300 are excessively distant from each other, and the reflectance $\alpha 2'$ of the first optical film 40 at the wavelength $\lambda 3$ becomes significantly small. The reflectance of the second optical film 50 at the wavelength $\lambda 3$ is $\alpha 1'$. In the example of FIG. 1C, since the value of $\alpha 2'$ is small, the product ($\alpha 1' \cdot \alpha 2'$) of the reflectances of the optical films 40 and 50 at the wavelength $\lambda 3$ consequently becomes significantly small, making it impossible to secure the reflectance which is required at minimum.

When designing actual optical films, the value of $\alpha 1 \cdot \alpha 2$ (the product of $\alpha 1$ and $\alpha 2$) to be designed is appropriately determined depending on the design conditions or the like, and accordingly, it is difficult to define the reference uniformly. However, from experience of design for an optical filter, for example, if $\alpha 1 = 0.8$ and $\alpha 2 = 0.8$, an optical filter can be designed, and it is thus considered that the reflectances should have these values to the minimum. That is, it is considered that $\alpha 1 \cdot \alpha 2$ should be equal to or greater than 0.64 as the reference from experience. Therefore, in the example shown in FIG. 1B, it is preferable that the reflectances of the first optical film and the second optical film are set such that α1·α2≥0.64 is established.

Figure 2A:
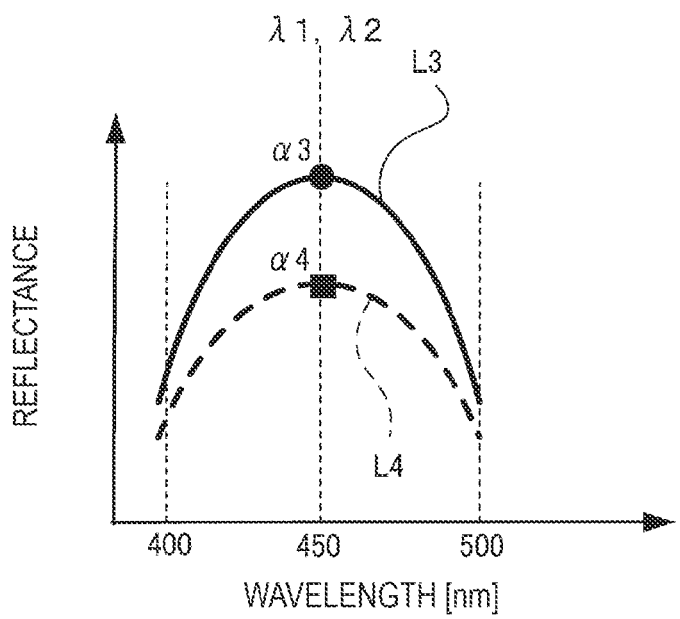
FIGS. 2A and 2B are diagrams showing another example of the reflective characteristics of a pair of optical films which are the constituent elements of an optical filter.
Figure 2B:
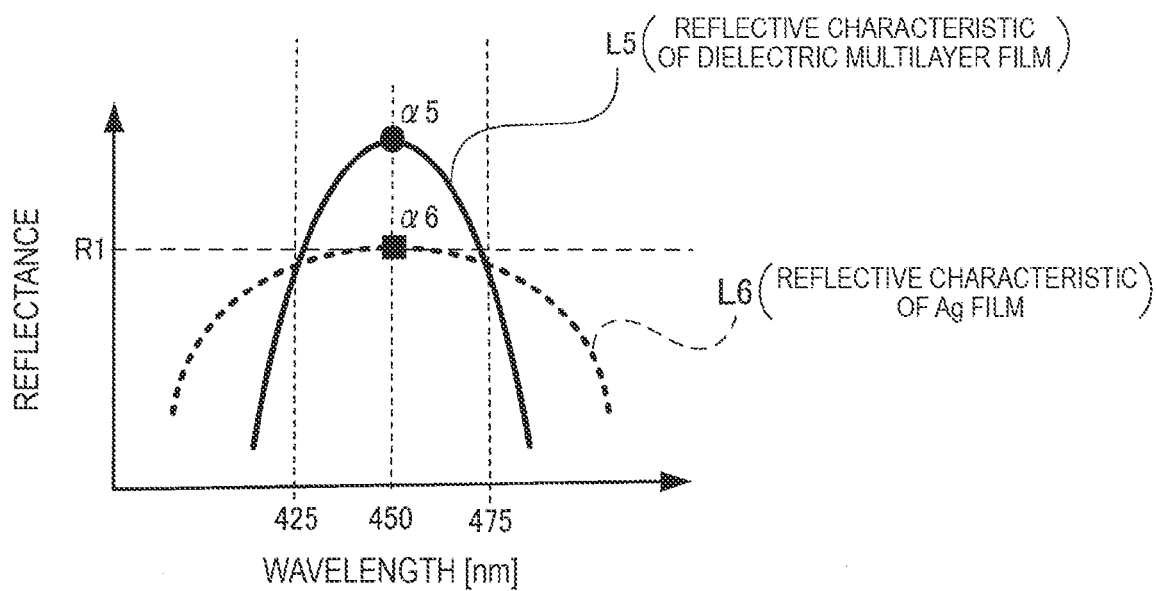

FIGS. 2A and 2B are diagrams showing another example of the reflective characteristics of a pair of optical films which are the constituent elements of an optical filter. In FIG. 2A, a characteristic line L3 which represents the reflective characteristic of the first optical film 40 is indicated by a solid line, and a characteristic line L4 which represents the reflective characteristic of the second optical film 50 is indicated by a broken line. In the example shown in FIG. 2A, the first center wavelength λ1 of the first optical film 40 corresponding to the peak reflectance is 450 nm, and the second center wavelength λ2 of the second optical film 50 corresponding to the peak reflectance is also 450 nm. The center wavelengths are identical. The identical center wavelength is referred to as a common center wavelength.

The reflectance of light at the common center wavelength in the first optical film 40 is set to first reflectance α3. The reflectance of light at the common center wavelength in the second optical film 50 is set to second reflectance α4 different from the first reflectance. That is, in the example shown in FIG. 2A, while the center wavelengths λ1 and λ2 of the first optical film 40 and the second optical film 50 are identical, the reflectances α3 and α4 of the optical films 40 and 50 at the center wavelength (common center wavelength) are set to different values. As a method of making the reflectance at the common center wavelength differ between the first optical film 40 and the second optical film 50, for example, a method can be used in which the optical films 40 and 50 are formed of dielectric multilayer films using the same material, and the number of layers differ between the optical films 40 and 50. A method can also be used in which the materials for forming the optical films 40 and 50 are different from each other. A method can also be used in which the structures of the optical films 40 and 50 are different from each other.

In the example shown in FIG. 2B, the material for forming the first optical film 40 is different from the material for forming the second optical film 50. For example, a dielectric multilayer film is used as the first optical film 40, and the second optical film 50 is formed of a film (Ag simplex film or Ag alloy film) mainly consisting of Ag (silver). The following description will be described assuming that an Ag simplex film is used as the second optical film 50.

In FIG. 2B, a characteristic line L5 which represents the reflective characteristic of the first optical film (dielectric multilayer film) 40 is indicated by a solid line, and a characteristic line L6 which represents the reflective characteristic of the second optical film (Ag simplex film) 50 is indicated by a broken line. The center wavelengths of the optical films 40 and 50 are both 450 nm, and reflectances α5 and α6 of the optical films 40 and 50 at the common center wavelength (450 nm) are different from each other. From this point, the example of FIG. 2B has the same common features as in the example of FIG. 2A.

However, in the example of FIG. 2B, the characteristic line L6 which represents the reflective characteristic of the second optical film 50 has a feature to be substantially flat (even) in a significantly wide wavelength band. That is, the second optical film 50 using the Ag simplex film substantially maintains the reflectance to R1, for example, in the wavelength band of 425 nm to 475 nm.

When designing a normal optical film, since the reflectance of each of the first optical film 40 and the second optical film 50 differs by wavelength, it is necessary to constantly take into consideration the reflectance of each of the first optical film 40 and the second optical film 50 at a wavelength to be noticed. In contrast, in the example shown in FIG. 2B, after the reflectance of the second optical film 50 is fixed to R1, only the reflectance of the first optical film 40 may be adjusted, making it easy to design the optical films. In this way, if different types of materials are combined, it is possible to realize the characteristics of the optical filter which could not be obtained by a combination of the same materials.

Second Embodiment

In this embodiment, a specific example of design for a first optical film and a second optical film will be described. FIGS. 3A to 3D are diagrams illustrating a specific example of design for optical films in an Etalon filter. In the following description, it is assumed that dielectric multilayer films are used as optical films. In the following description, an example where the mirror structure according to an embodiment of the invention is not used will be appropriately referenced as a comparative example.

As shown in FIG. 3A, light (including a red light component, a blue light component, and a yellow light component) irradiated from a light source 100 is reflected by a sample 200 or transmits the sample 200, and then light is input to an Etalon filter 300. The Etalon filter 300 functions as a spectroscope, and transmits only light components in a desired wavelength band from among the input light components (including a red light component, a blue light component, and a yellow light component). In the example of FIG. 3A, the Etalon filter 300 transmits only the blue light component. Light (transmitted light) having passed through the Etalon filter 300 is incident on a light-receiving unit 400 which includes a photodiode PD or the like. The light-receiving unit 400 converts a light signal to an electrical signal through photoelectric conversion. For example, colorimetry of the sample 200, component analysis of the sample 200, or the like is performed on the basis of the obtained electrical signal.

Figure 10:
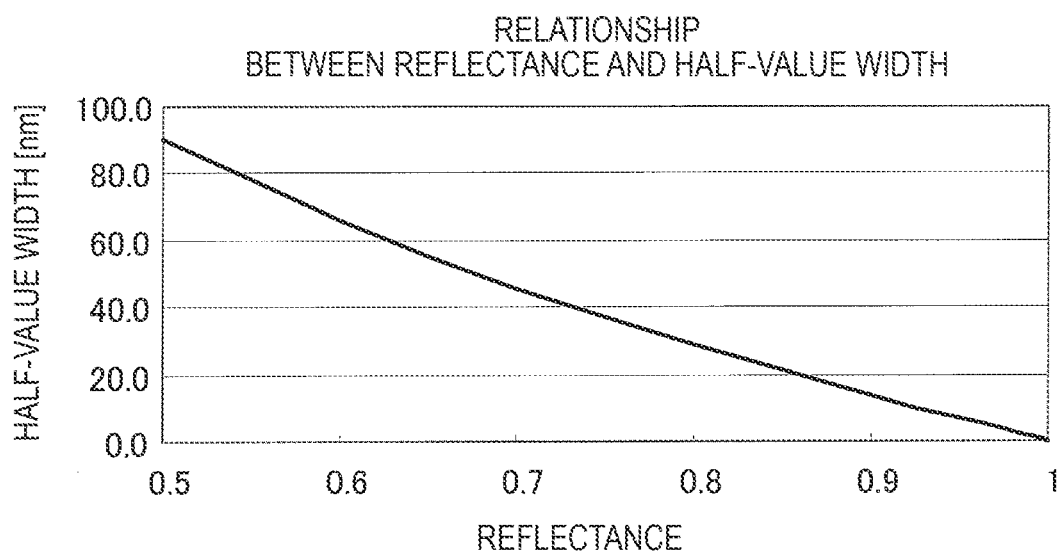
FIG. 10 is a diagram showing an example of the relationship between the reflectance of an optical film and the half-value width of an optical filter.

The measurement sensitivity, measurement precision, or the like of a spectrometric instrument is determined depending on the transmissive characteristic of the Etalon filter 300. As described above, the transmissive characteristic of the Etalon filter 300 is determined depending on the reflectances of the first optical film 40 and the second optical film 50. When the reflectance of each of the optical films 40 and 50 is high, the half-value width becomes small, and when the reflectance of each of the optical films 40 and 50 is low, the half-value width becomes large. Description will be continued with reference to FIG. 10. FIG. 10 is a diagram showing an example of the relationship between the reflectance of each optical film and the half-value width of an optical filter. As will be apparent from FIG. 10, when the reflectance of each optical film is high, the half-value width becomes small, and when the reflectance of each optical film becomes low, the half-value width becomes large.

Returning to FIGS. 3A to 3D, description will be continued. When the half-value width of the Etalon filter 300 is small, only light of a desired wavelength is extracted, thereby improving the measurement precision. However, since the quantity of light which transmits the Etalon filter 300 is lowered, the light-receiving unit 400 may not detect light. Meanwhile, if the half-value width of the Etalon filter 300 is large, the quantity of transmitted light increases, and the light-receiving unit 400 easily detects light. However, since light other than a desired wavelength is also detected, it is undeniable that the wavelength resolution is lowered. For this reason, it is necessary to design optical films to satisfy both the half-value width and the light quantity.

The factor which determines the half-value width of the Etalon filter is the reflectance of each optical film. As a general method which controls the reflectance, a method is known which changes the materials or changes the number of layers of each optical film. However, when the material changes, there is a limit on the types of usable materials. When the number of layers of each optical film changes, the reflectance has only a discrete value with respect to the number of layers, and accordingly, it may be impossible to design a target reflectance (or half-value width or light quantity).

As shown in FIG. 3B, a dielectric multilayer film which is used as an optical film has a configuration in which a high-refractive-index layer (H) and a low-refractive-index layer (L) are alternately laminated. In the example shown in FIG. 3B, a $TiO_2$ film (refractive index n=2.5) is used as the high-refractive-index layer (H), and a $SiO_2$ film (refractive index n=1.5) is used as the low-refractive-index layer (L). However, this example is just an example, and the invention is not limited thereto.

The example of FIG. 3B is a comparative example where an asymmetrical mirror structure is not used. That is, in the example of FIG. 3B, the first optical film 40 on the first substrate 20 and the second optical film 50 on the second substrate 30 have the same reflective characteristic. When a combination of a single $TiO_2$ film and a single $SiO_2$ film is one pair, the first optical film 40 is a laminated film of three pairs, and the second optical film 50 is also a laminated film of three pairs. That is, the number of pairs of layers of each of the optical films 40 and 50 is 3. The thickness of the $TiO_2$ film is the same between the optical films 40 and 50, and the thickness of the $SiO_2$ film is also the same between the optical films 40 and 50.

With regard to design for the optical films 40 and 50, a method called $\lambda/4$ design is used. For example, when the refractive index of the $TiO_2$ film which forms the first optical film 40 is n, a design wavelength $\lambda 1$ is 450 nm, and a thickness is d, the thickness d of the $TiO_2$ film is determined such that $nd=\lambda 1/4$ is established. The thickness of the $SiO_2$ film which forms the first optical film 40 is determined in the same manner. In the example of FIG. 3B, since the reflective characteristics of the first optical film 40 and the second optical film 50 are symmetrical, in the second optical film 50, with $\lambda/4$ design using a design wavelength $\lambda 2$ of 450 nm, the thickness of the $TiO_2$ film and the thickness of the $SiO_2$ film are determined.

FIG. 3C shows the relationship between the number of layers of each of the first optical film and the second optical film and the half-value width. In the symmetrical mirror structure of FIG. 3B, in an example where the number of layers of each of the first optical film 40 and the second optical film 50 is 10 (an example of 10-10 layers), the half-value width becomes A1. In an example where the number of layers of each of the first optical film 40 and the second optical film 50 is 8 (an example of 8-8 layers), the half-value width becomes A2. In an example where the number of layers of each of the first optical film 40 and the second optical film 50 is 6 (an example of 6-6 layers), the half-value width becomes A3.

FIG. 3D shows the relationship between the half-value width of the Etalon filter and the quantity of transmitted light. A light quantity B1 of FIG. 3D corresponds to a half-value width A1 shown in FIG. 3C, a light quantity B2 corresponds to a half-value width A2 shown in FIG. 3C, and a light quantity B3 corresponds to a half-value width A3 shown in FIG. 3C.

As will be apparent from FIGS. 3C and 3D, when the number of layers changes, the half-value width and the light quantity cannot but change discretely. Thus, for example, when the half-value width of the Etalon filter is set to 3 nm, and a tolerance is ±0.5 nm, the required specification may not be satisfied only with a change in the number of layers in the comparative example shown in FIG. 3B.

Accordingly, in this embodiment, the reflective characteristics of the first optical film 40 and the second optical film 50 are intentionally asymmetrized, and the asymmetrical characteristics of the optical films shown in FIG. 1 or 2 are realized, thereby realizing the characteristics of the optical filter which could not be realized in the related art.

FIGS. 4A to 4C are diagrams illustrating an example where a mirror structure is used in which the thickness of a dielectric multilayer film differs between a first optical film and a second optical film. In the example shown in FIG. 4A, a $TiO_2$ film (refractive index n=2.5) is used as a high-refractive-index layer (H), and a $SiO_2$ film (refractive index n=1.5) is used as a low-refractive-index layer (L). The $TiO_2$ film is a first material layer (first material film), and the $SiO_2$ film is a second material layer (second material film).

The first optical film 40 is a first laminated film in which m (where m is an integer equal to or greater than 1) sets (pairs) of layers, each having the first material film ($TiO_2$ film) and the second material film ($SiO_2$ film), are laminated. In the example of FIG. 4A, m=3 is set. That is, the number of sets of layers of the first optical film 40 is 3.

The second optical film 50 is a second laminated film in which m sets (pairs) of layers, each having the first material film ($TiO_2$ film) and the second material film ($SiO_2$ film), are laminated (in this example, m=3), and the thickness h2 of a set (one pair) of layers is different from the thickness h1 of a set (one pair) of layers in the first optical film 40.

As described above, although both the first optical film 40 and the second optical film 50 are designed by a method called $\lambda/4$ design, in the example of FIG. 4A, a difference in the design wavelength is provided between the first optical film 40 and the second optical film 50. That is, the design wavelength $\lambda 1$ in the first optical film 40 is set to 500 nm, and the design wavelength $\lambda 2$ in the second optical film 50 is set to 400 nm. As a result, the thickness of a set (one pair) of layers in the first optical film 40 becomes h1, and the thickness of a set (one pair) of layers in the second optical film 50 becomes h2 different from h1. In this example, h1>h2.

As described above, in the example of FIG. 4A, the first optical film 40 and the second optical film 50 are formed of laminated films, and while the number of sets of layers is the same, the thickness of a set of layers having the first material layer ($TiO_2$ film) and the second material layer ($SiO_2$ film) differs between the optical films 40 and 50. Thus, the reflective characteristic of the first optical film 40 and the reflective characteristic of the second optical film 50 are asymmetrized. Varying in the film thickness in the laminated film can be achieved by slightly varying the manufacturing process and is easily realized.

The thickness of at least one of the first material layer ($TiO_2$ film) and the second material layer ($SiO_2$ film) changes, thereby changing the thickness of a set (one pair) of layers. This case also falls within this example.

FIG. 4B shows an example of the effect of asymmetrization of the reflective characteristics of the optical films. FIG. 4B shows the characteristics (peak wavelength, transmittance, half-value width, and light quantity ratio) of the Etalon filter in the comparative example (the design wavelengths $\lambda 1$ and $\lambda 2$ are both 450 nm) of FIG. 3B described above and the characteristics (peak wavelength, transmittance, half-value width, and light quantity ratio) of the Etalon filter in the example (the design wavelength λ1 is 400 nm and the design wavelength λ2 is 500 nm) of FIG. 4A.

With the asymmetrization of the reflective characteristics of the optical films, while the peak wavelength does not change, the transmittance at the center wavelength changes from 93.1 to 82.9, the half-value width changes from 1.6 nm to 2.6 nm, and the light quantity ratio changes from 1 to 1.36.

FIG. 4C shows the spectral characteristics of the Etalon filter in two examples shown in FIG. 4B. In FIG. 4C, a characteristic line which represents the characteristic of the comparative example (an example where the reflective characteristics are asymmetrical) is indicated by a solid line, and a characteristic line which represents the characteristic of this embodiment (an example where the reflective characteristics are asymmetrical) is indicated by a broken line. A half-value width w1 is 1.6 nm, and a half-value width w2 is 2.6 nm. As will be apparent from FIG. 4C, the reflective characteristics of the first optical film 40 and the second optical film 50 are asymmetrized, thereby realizing the spectral characteristics of the Etalon filter 300 which could not be obtained when the reflective characteristics were symmetrical.

Figure 5A:
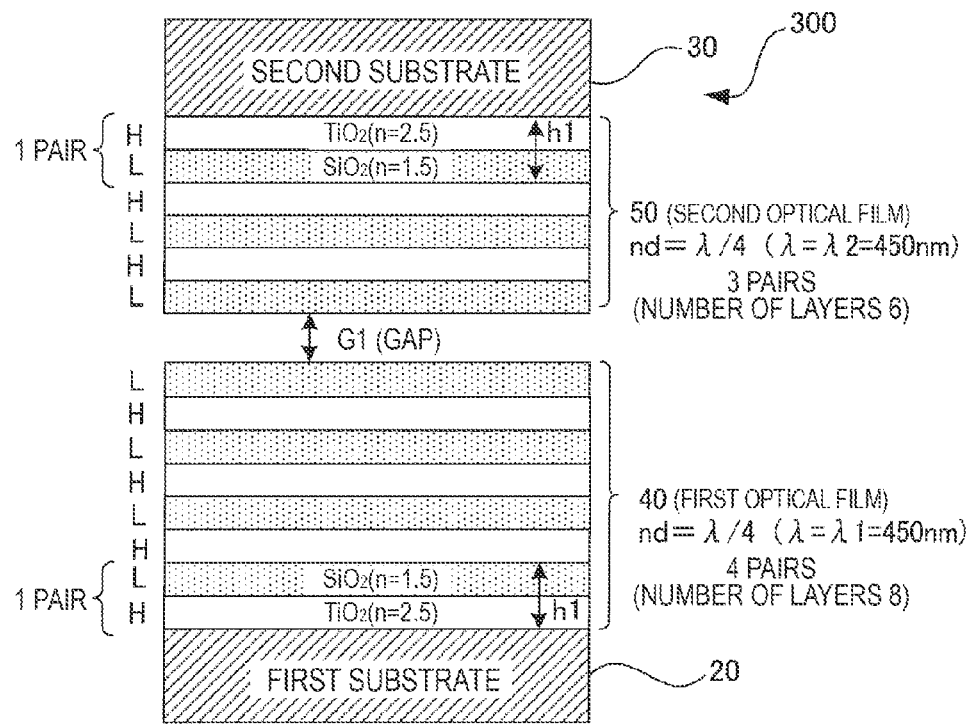
FIGS. 5A and 5B are diagrams illustrating an example where a mirror structure is used in which the number of layers of a dielectric multilayer film (the number of pairs) differs between a first optical film and a second optical film.
Figure 5B:
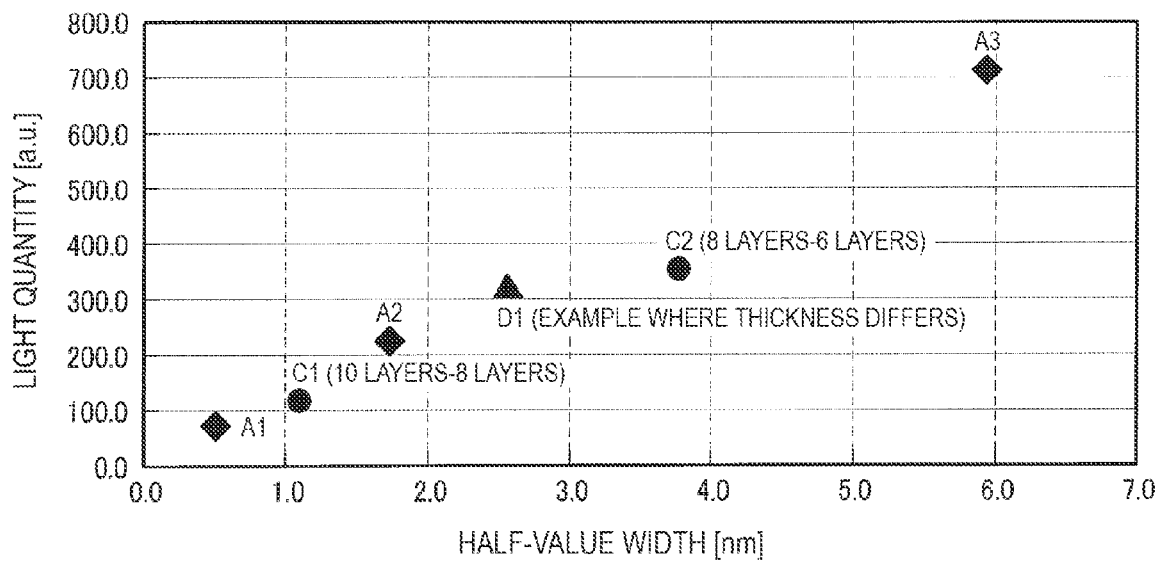

FIGS. 5A and 5B are diagrams illustrating an example where a mirror structure is used in which the number of dielectric multilayer films (the number of pairs) differs between the first optical film and the second optical film. In the example shown in FIG. 5A, the number of layers (the number of pairs) differs between the optical films 40 and 50, such that the reflective characteristics of the optical film are asymmetrized.

That is, in the example of FIG. 5A, a $TiO_2$ film (refractive index n=2.5) is used as a high-refractive-index layer (H), and a $SiO_2$ film (refractive index n=1.5) is used as a low-refractive-index layer (L). The $TiO_2$ film is a first material layer (first material film), and the $SiO_2$ film is a second material layer (second material film).

The first optical film 40 is a first laminated film in which m (where m is an integer equal to or greater than 1) sets (pairs) of layers, each having the first material film ($TiO_2$ film) and the second material film ($SiO_2$ film), are laminated. In the example of FIG. 5A, m=4 is set. That is, the number of sets of layers of the first optical film 40 is 4, and the total number of layers to be laminated is 8.

Meanwhile, the second optical film 50 is a second laminated film in which n (where n is an integer equal to or greater than 2, and n≠m) sets (pairs) of layers, each having the first material film ($TiO_2$ film) and the second material film ($SiO_2$ film), are laminated. In the example of FIG. 5A, n=3 is set. That is, the number of sets of layers of the first optical film 40 is 3, and the total number of layers to be laminated is 6. Varying the number of layers (the number of pairs) in the laminated film can be achieved by slightly varying the manufacturing process and is easily realized.

Even when the number of layers of the first optical film 40 and the number of layers of the second optical film are reversed, there is no change in the spectral characteristics of the Etalon filter. For example, when the number of sets of layers (the number of pairs) of the first optical film 40 is "2" and the number of sets of layers (the number of pairs) of the second optical film 50 is "1", and when the number of sets of layers (the number of pairs) of the first optical film 40 is "1" and the number of sets of layers (the number of pairs) of the second optical film 50 is "2", there is no difference in the spectral characteristics of the Etalon filter.

In the example shown in FIG. 5A, it is possible to realize the optical filter characteristics which are different from the optical filter characteristics in the comparative example of FIG. 3B and the optical filter characteristics in the example of FIG. 4A. FIG. 5B shows multiple examples of the correspondence relationship between the half-value width and the light quantity of the optical filter.

Points C1 and C2 shown in FIG. 5B indicate the characteristics in the example (the example where the number of layers differs to make reflective characteristics different from each other) shown in FIG. 5A. The point C1 shows the relationship between the half-value width and the light quantity when the number of layers of the first optical film 40 is 10 and the number of layers of the second optical film 50 is 8 (an example of 10 layers-8 layers). The point C2 shows the relationship between the half-value width and the light quantity when the number of layers of the second optical film 50 is 8 and the number of layers of the second optical film 50 is 6. That is, the point C2 shows the characteristic of the optical filter 300 which is obtained when the mirror structure (the example of 8 layers-6 layers) shown in FIG. 5A is used.

A point D1 in FIG. 5B shows the characteristics of the optical filter 300 which is obtained when the mirror structure shown in FIG. 4A in which the film thickness differs between the optical films is used. Points A1 to A3 show the characteristics of the optical filter 300 which are obtained when the mirror structure shown in FIG. 3D in which the reflective characteristics are asymmetrical is used.

As will be apparent from FIG. 5B, the reflective characteristics are asymmetrized between the optical films 40 and 50, and the characteristics (the point C1, the point C2, and the point D1) which were not obtained in the related art are obtained. Therefore, it becomes possible to improve the degree of freedom in designing the optical films and to realize more various optical filter characteristics.

Although an example where a film thickness differs and an example where the number of layers differs have been described, the invention is not limited thereto. For example, the film thickness may differ between the optical films 40 and 50, and the number of layers may also change between the optical films 40 and 50. That is, with the adjustment of the number of layers (the number of pairs) in the laminated film and the adjustment of the thickness of a set of layers, it is possible to control the reflective characteristics of the optical films in more various forms. The configuration of the optical films can be achieved by slightly varying the manufacturing process and is easily realized.

Figure 6A:
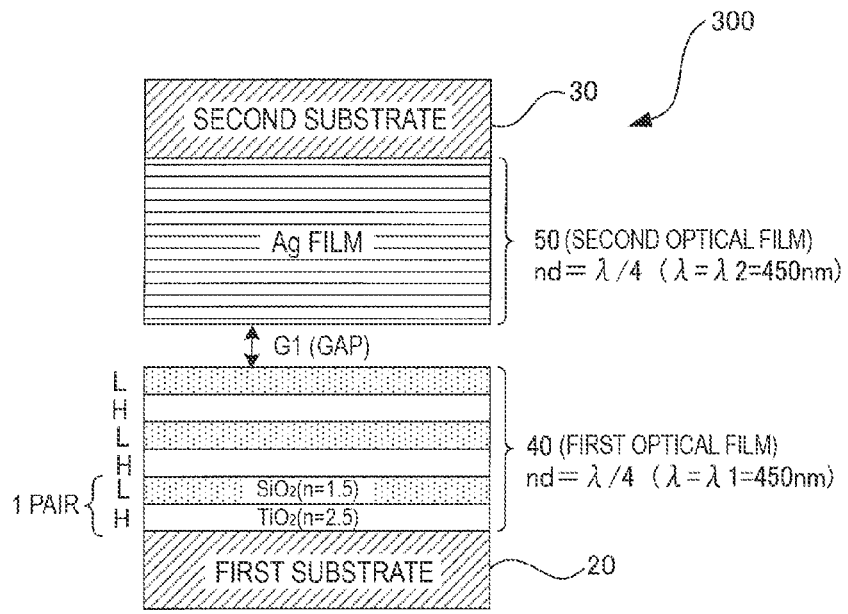
FIGS. 6A to 6C are diagrams illustrating an example where a material for forming a first optical film and a material for forming a second optical film are different from each other.
Figure 6B:
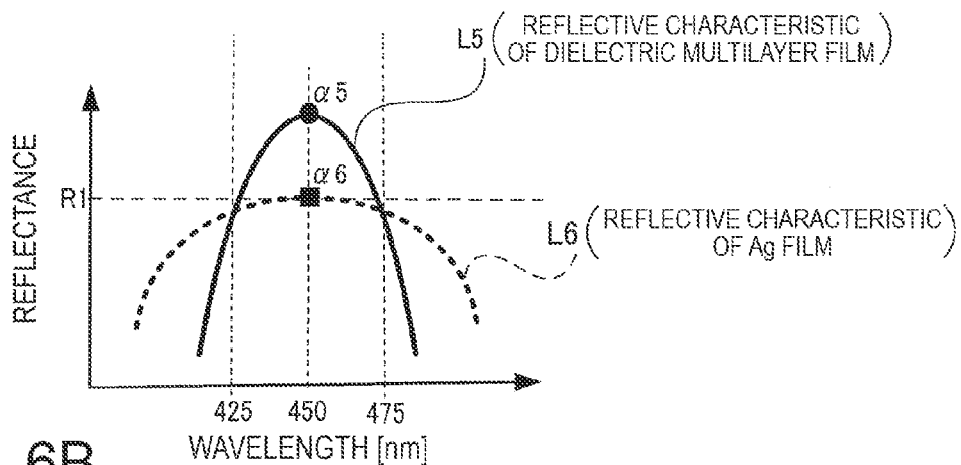
Figure 6C:
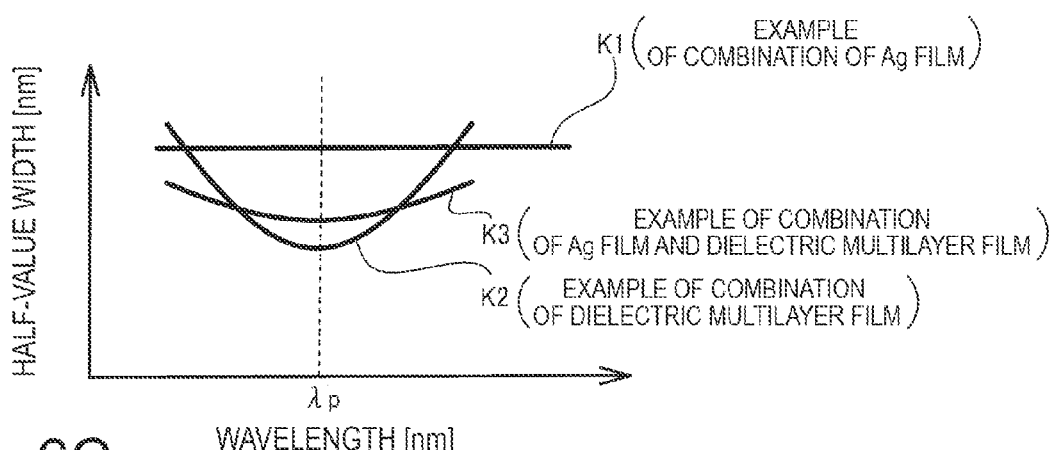

FIGS. 6A to 6C are diagrams illustrating an example where a material for forming a first optical film and a material for forming a second optical film are different from each other.

In FIG. 6A, three pairs of dielectric multilayered films which are designed with the design wavelength λ1 of 450 nm are used as the first optical film 40, and an Ag film (in this case, an Ag simplex film) is used as the second optical film 50. The material differs between the optical films 40 and 50, such that the reflective characteristic of the first optical film 40 can be asymmetrical to the reflective characteristic of the second optical film 50. With a combination of optical films using different materials, it is possible to design the Etalon filter 300 having more various characteristics.

In FIG. 6B, a characteristic line L5 which represents the reflective characteristic of the first optical film (dielectric multilayer film) 40 is indicated by a solid line, and a characteristic line L6 which represents the reflective characteristic of the second optical film (Ag simplex film) 50 is indicated by a broken line. The center wavelengths of the optical films 40 and 50 are both 450 nm, and the reflectances of the optical films 40 and 50 at the common center wavelength (450 nm) are α5 and α6. In the example of FIG. 6B, a characteristic line L6 which represents the reflective characteristic of the second optical film 50 has a feature to be substantially flat (even) in a significantly wide wavelength band. That is, the second optical film 50 using the Ag simplex film substantially maintains the reflectance to R1, for example, in the wavelength band of 425 nm to 475 nm.

When designing a normal optical film, since the reflectance of each of the first optical film 40 and the second optical film 50 differs by wavelength, it is necessary to constantly take into consideration the reflectance of each of the first optical film 40 and the second optical film 50 at a wavelength to be noticed. In contrast, in the example shown in FIG. 6B, after the reflectance of the second optical film 50 is fixed to R1, only the reflectance of the first optical film 40 may be appropriately adjusted, making it easy to design the optical films. In this way, if different types of materials are combined, it is possible to realize the characteristics of the optical filter which could not be obtained by a combination of the same materials.

FIG. 6C shows an example of the characteristics of the optical filter which are obtained by a combination of different types of materials. FIG. 6C shows an example of a change in the half-value width of the Etalon filter 300. FIG. 6C shows three characteristic examples. A characteristic line K1 represents the characteristic of the half-value width of the Etalon filter 300 which is obtained when Ag films are used as both the first optical film 40 and the second optical film 50. A characteristic line K2 represents the characteristic of the half-value width of the Etalon filter 300 which is obtained when dielectric multilayer films are used as both the first optical film 40 and the second optical film 50. A characteristic line K3 represents the characteristic of the half-value width of the Etalon filter 300 which is obtained when a dielectric multilayer film is used as the first optical film 40 and an Ag film is used as the second optical film 50. The materials of the optical films are selected, and a combination of the materials is selected, such that three different half-value widths can be realized with respect to a wavelength λp to be noticed. Therefore, it is possible to design the Etalon filter 300 having various characteristics.

The structure may differ between the first optical film 40 and the second optical film 50, such that the reflective characteristic of the first optical film 40 and the reflective characteristic of the second optical film 50 are asymmetrized. Therefore, the degree of freedom in designing the Etalon filter 300 is improved.

For example, there may be a case where the first optical film 40 is a laminated film with a set of layers having a first material layer and a second material layer as a constituent unit, and the second optical film 50 is a laminated film with a set of layers having a first material layer, a second material layer, and a third material layer as a constituent unit.

While the materials which are used for the optical films 40 and 50 have the same molecular formula, a way of bonding atoms or groups in each compound changes by the chemical and physical actions of a catalyst or the like. Thus, the compounds (isomers) have the same molecular formula but are different in the structural formula. This also corresponds to a case where the structures of the optical films are different from each other.

Third Embodiment

Figure 7A:
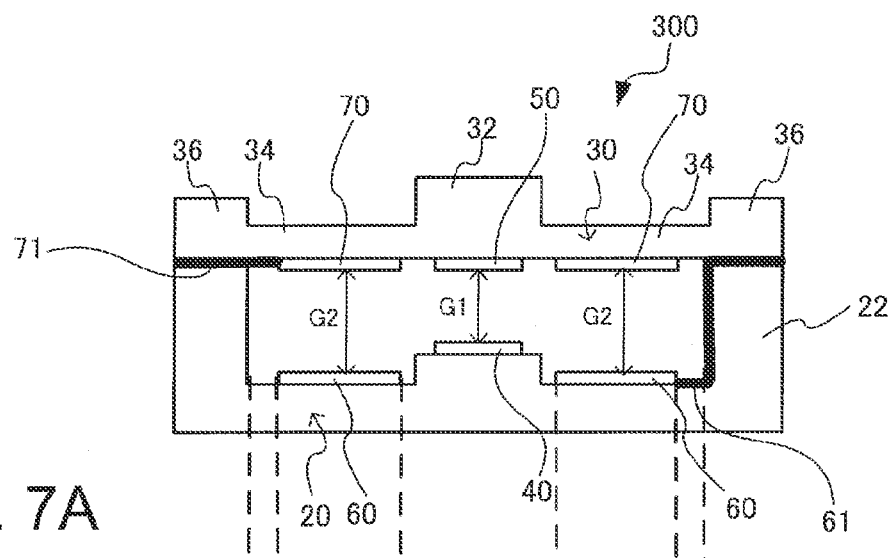
FIGS. 7A to 7C are diagrams illustrating an example of a specific structure of a variable gap Etalon filter and the operation of the variable gap Etalon filter.
Figure 7B:
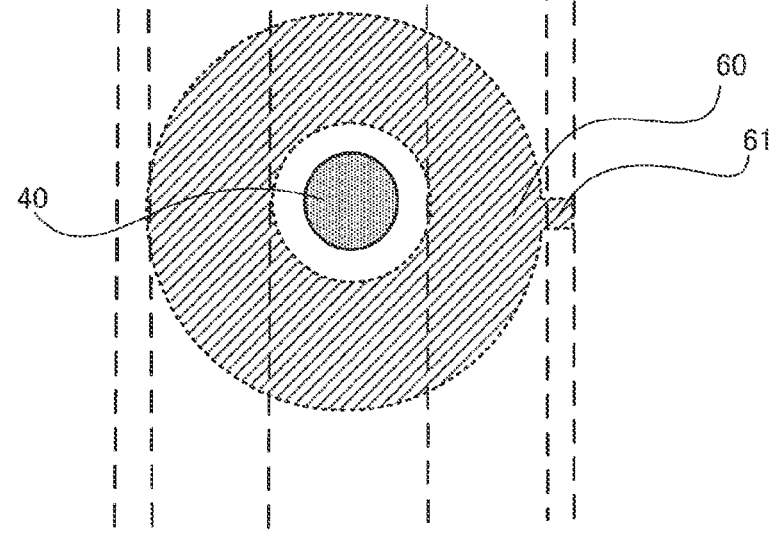
Figure 7C:
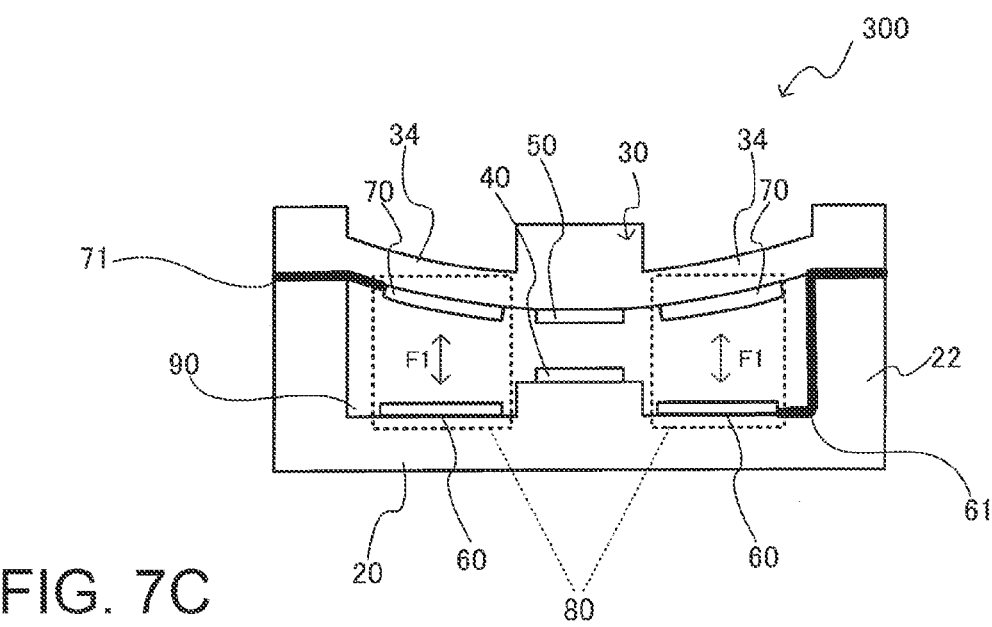

Next, an example of the specific structure of a variable gap Etalon filter will be described. FIGS. 7A to 7C are diagrams illustrating an example of the specific structure of a variable gap Etalon filter and the operation of the variable gap Etalon filter. FIG. 7A is a diagram showing the sectional structure of a variable gap Etalon filter in a state where a driving voltage is not applied (initial gap G1). FIG. 7B is a diagram showing a layout example of the first optical film 40 and a first electrode 60 formed on the first substrate 20. FIG. 7C is a diagram showing the sectional structure of a variable gap Etalon filter in a state where a driving voltage is applied (gap G3). The variable gap Etalon filter as the Etalon filter 300 shown in FIGS. 7A to 7C uses a mirror which includes a pair of optical films having asymmetrical reflective characteristics described in the foregoing embodiment.

In FIG. 7A, for example, a support portion 22 is formed as a single body with the first substrate 20 to movably support the second substrate 30. The support portion 22 may be provided in the second substrate 30 or may be formed separately from the first substrate 20 and the second substrate 30.

The first substrate 20 and the second substrate 30 can be formed of, for example, various kinds of glass, such as soda glass, crystalline glass, quartz glass, lead glass, potassium glass, borosilicate glass, and alkali-free glass, crystal, or the like. Of these, as the materials for forming the substrates 20 and 30, for example, glass containing an alkali metal, such as sodium (Na) or potassium (K), is preferably used. If the substrates 20 and 30 are formed of these kinds of glass, it becomes possible to improve adhesiveness of the optical films (reflecting films) 40 and 50 or a first electrode 60 and a second electrode 70 or the bonding strength between the substrates. The two substrates 20 and 30 are bonded to each other, for example, by surface activated bonding using a plasma-polymerized film and formed as a single body. The first substrate 20 and the second substrate 30 are formed, for example, in a square shape having each side of 10 mm, and the maximum diameter of a portion which functions as a diaphragm is, for example, 5 mm.

The first substrate 20 is formed by processing a glass base material having a thickness of 500 μm through etching.

The second substrate 30 as a movable substrate has a thin portion (diaphragm) 34, and thick portions 32 and 36. The thin portion 34 is provided, such that desired bend (deformation) can be generated in the second substrate 30 with a lower driving voltage. Therefore, power saving is realized.

In the first substrate 20, for example, the circular first optical film 40 is formed in a first opposing surface at the center of an opposing surface to the second substrate 30. Similarly, the second substrate 30 is formed, for example, by processing a glass base material having a thickness of 200 μm through etching. In the second substrate 30, for example, the circular second optical film 50 is formed at the center position of an opposing surface to the first substrate 20 to face the first optical film 40. FIG. 7B shows the first optical film 40 and the first electrode 60 around the first optical film 40. A first wire 61 is connected to the first electrode 60.

The first optical film 40 and the second optical film 50 are formed, for example, in a circular shape having a diameter of about 3 mm. The first optical film 40 and the second optical film 50 can be formed, for example, by a method, such as sputtering. The thickness of each of optical films can be, for example, about 0.03 μm. In this embodiment, for example, optical films which have a characteristic capable of dispersing the entire visible light range can be used as the first optical film 40 and the second optical film 50.

The first optical film 40 and the second optical film 50 are arranged to face each other through a first gap G1 in a voltage non-application state shown in FIG. 7A. Although in this case, the first optical film 40 is a fixed mirror and the second optical film 50 is a movable mirror. The first optical film 40 and the second optical film 50 may be reversed or may be both movable mirrors.

In plan view when viewed from the thickness direction of the first substrate 20, the first electrode 60 is formed around the first optical film 40. In the following description, the plan view refers to a case where the substrate plane is viewed from the thickness direction of each substrate. Similarly, the second electrode 70 is provided on the second substrate 30 to face the first electrode 60. The first electrode 60 and the second electrode 70 are arranged to face each other through a second gap G2. The surfaces of the first electrode 60 and the second electrode 70 are covered with insulating films.

As shown in FIG. 7B, the first electrode 60 does not overlap the first optical film 40 in plan view. Thus, it is easy to design the optical characteristic of the first optical film 40. The same is applied to the second electrode 70 and the second optical film 50.

For example, the second electrode 70 is at a common potential (for example, a ground potential) and a voltage is applied to the first electrode 60, such that, as shown in FIG. 7C, electrostatic force F1 (in this case, electrostatic attractive force) indicated by an arrow can be generated between the electrodes. That is, the first electrode 60 and the second electrode 70 form an electrostatic actuator 80. The gap between the first optical film 40 and the second optical film 50 can be variably controlled to the gap (G3) smaller than the initial gap (G1) by the electrostatic attractive force F1. The wavelength of transmitted light is determined depending on the size of the gap between the optical films. Therefore, a transmission wavelength can be selected by changing the gap.

As indicated by bold lines in FIG. 7A, a first wire 61 is connected to the first electrode 60, and a second wire 71 is connected to the second electrode 70.

As described above, in this embodiment, the reflective characteristics of the first optical film 40 and the second optical film 50 are asymmetrized. As a result, when the thickness of the first optical film 40 is different from the thickness of the second optical film 50, it is preferable to design such that the thickness of the second optical film 50 formed on the second substrate 30 serving as a movable substrate becomes small.

That is, since the second substrate 30 is a movable substrate, it is important that a movable unit (diaphragm) is appropriately bent (deformed) by electrostatic force which is generated between the first electrode and the second electrode. Thus, the thickness of the second optical film 50 provided on the second substrate 30 serving as the movable substrate may be set to be smaller than the thickness of the first optical film 40 provided on the first substrate 20 serving as the fixed substrate. Therefore, stress by the second optical film 50 on the second substrate 30 serving as the movable substrate is reduced, making it easy to secure satisfactory bendability of the movable unit.

For the same reason, it is preferable that residual stress (film stress) of the second optical film 50 on the second substrate 30 side is set to be smaller than residual stress (film stress) of the first optical film 40 on the first substrate 20 side.

Fourth Embodiment

Figure 8A:
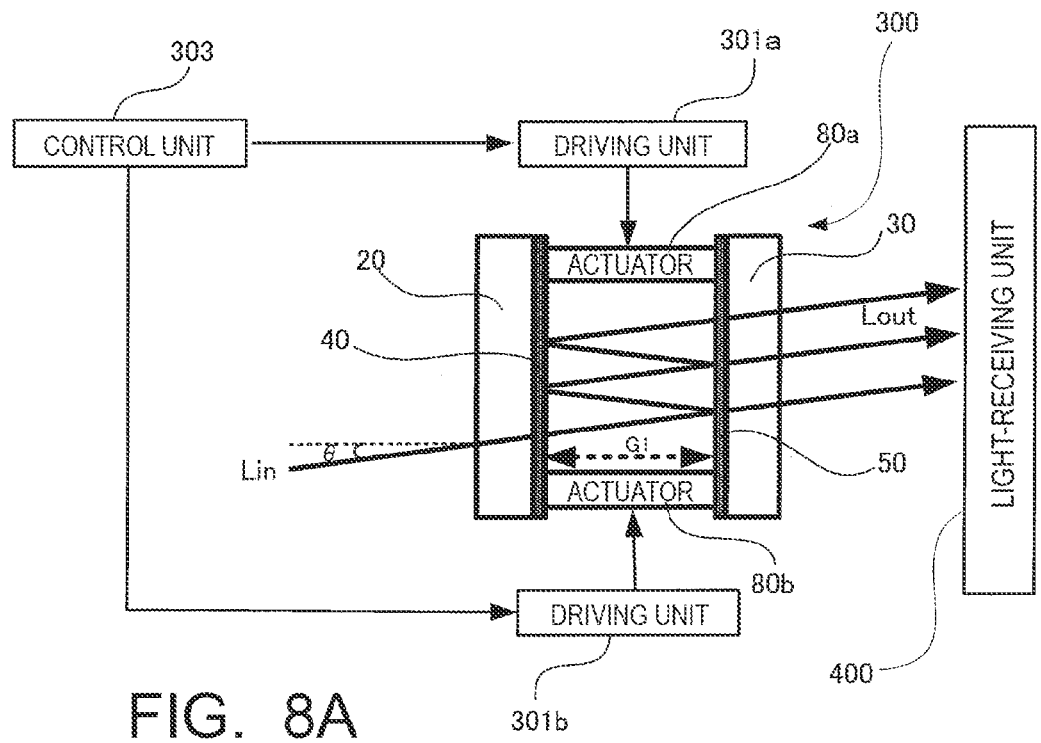
FIGS. 8A and 8B are diagrams showing an example of the structure of an optical filter using a variable gap Etalon filter and an example of the configuration of a spectrometric instrument.
Figure 8B:
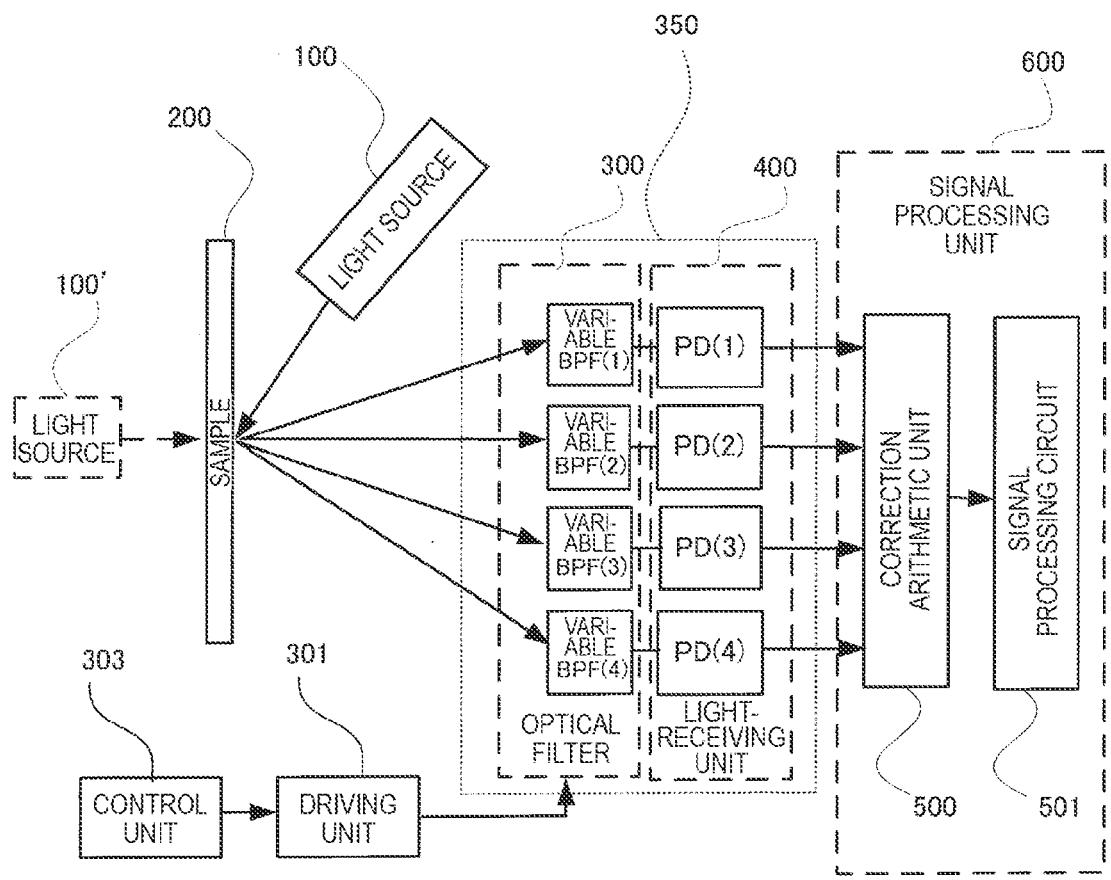

FIGS. 8A and 8B are diagrams showing an example of the structure of an optical filter using a variable gap Etalon filter and an example of a spectrometric instrument.

As shown in FIG. 8A, a variable gap Etalon filter as an Etalon filter 300 has a first substrate (for example, a fixed substrate) 20 and a second substrate (for example, a movable substrate) 30 which are arranged to face each other, a first optical film 40 which is provided on the principal surface (front surface) of the first substrate 20, a second optical film 50 which is provided on the principal surface (front surface) of the second substrate 30, and actuators (for example, electrostatic actuators, piezoelectric elements, or the like) 80a and 80b which are sandwiched between the substrates and adjust the gap (distance) between the substrates.

At least one of the first substrate 20 and the second substrate 30 may be a movable substrate, or both of them may be movable substrates. The actuator 80a and the actuator 80b are respectively driven by a driving unit (driving circuit) 301a and a driving unit (driving circuit) 301b. The operations of the driving units (driving circuits) 301a and 301b are controlled by a control unit (control circuit) 303.

Light Lin which is incident at a predetermined θ from the outside is hardly dispersed and passes through the first optical film 40. Light reflection is repeated between the first optical film 40 provided on the first substrate 20 and the second optical film 50 provided on the second substrate 30. Thus, light interference occurs, and only light of a wavelength satisfying a specific condition is intensified, and a part of intensified light passes through the second optical film 50 on the second substrate 30 and reaches the light-receiving unit (including a light-receiving element) 400. The wavelength of light which is intensified by interference depends on the gap G1 between the first substrate 20 and the second substrate 30. Therefore, the wavelength band of passing light can be changed by variably controlling the gap G1.

If the variable gap Etalon filter is used, a spectrometric instrument shown in FIG. 8B can be constituted. As an example of the spectrometric instrument, for example, there are a colorimeter, a spectroscopic analyzer, a spectrum analyzer, and the like.

In the spectrometric instrument shown in FIG. 8B, for example, when colorimetry of a sample 200 is performed, a light source 100 is used, and when spectroscopic analysis of a sample 200 is performed, a light source 100' is used.

A spectrometric instrument includes a light source 100 (or 100'), an optical filter (spectroscopic unit) 300 which includes a plurality of wavelength-variable band-pass filters (variable BPF(1) to variable BPF(4)), a light-receiving unit 400 which includes light-receiving elements PD(1) to PD(4), a signal processing unit 600 which performs given signal processing on the basis of light-receiving signal (light quantity data) obtained from the light-receiving unit 400 to obtain a spectrophotometric distribution or the like, a driving unit 301 which drives the variable BPF(1) to the variable BPF(4), and a control unit 303 which variably controls the spectral band of each of the variable BPF(1) to the variable BPF(4). The signal processing unit 600 has a signal processing circuit 501, and if necessary, a correction arithmetic unit 500 may be provided.

With the measurement of the spectrophotometric distribution, for example, it is possible to perform colorimetry of the sample 200, component analysis of the sample 200, or the like. As the light source 100 (100'), for example, a light source (solid-state light-emitting element light source) using a solid-state light-emitting element light source, such as an incandescent lamp, a fluorescent lamp, a discharge tube, or an LED, may be used.

An optical filter module 350 includes the Etalon filter 300 and the light-receiving unit 400. The optical filter module 350 can be applied to a spectrometric instrument and can be used as a receiving unit (including a light-receiving optical system and a light-receiving element) of an optical communication device. This example will be described below with reference to FIGS. 5A and 5B. The optical filter module 350 of this embodiment has advantages of suppressing deterioration in the characteristics of the optical film to achieve high reliability, increasing the wavelength range of transmitted light, and being small, lightweight, and convenient.

In the example of FIG. 8B, a plurality of wavelength-variable band-pass filters (variable BPF(1) to variable BPF (4)) are used. That is, a first variable gap Etalon BPF(1) and a second variable gap Etalon BPF(2) having different spectral bands are used. In this case, a configuration may be made such that, in the first variable gap Etalon BPF(1), the reflective characteristics of the first optical film 40 and the second optical film 50 are asymmetrical, and in the second variable gap Etalon BPF(2), the reflective characteristics of the first optical film 40 and the second optical film 50 are symmetrical. A variable gap Etalon which uses a mirror with asymmetrical reflective characteristics and a variable gap Etalon which uses a mirror with symmetrical reflective characteristics are mixed, thereby realizing the optical filter module 350 having various spectral characteristics compared to the related art.

In the example of FIG. 8B, first to third variable gap Etalons (BPF(1) to BPF(3)) having different spectral bands are used. A variable gap Etalon which uses a mirror with first asymmetrical reflective characteristics, a variable gap Etalon which uses a mirror with second asymmetrical reflective characteristics, and a variable gap Etalon which uses a mirror with symmetrical reflective characteristics are mixed, thereby realizing the optical filter module 350 having various spectral characteristics compared to the related art.

Fifth Embodiment

Figure 9:
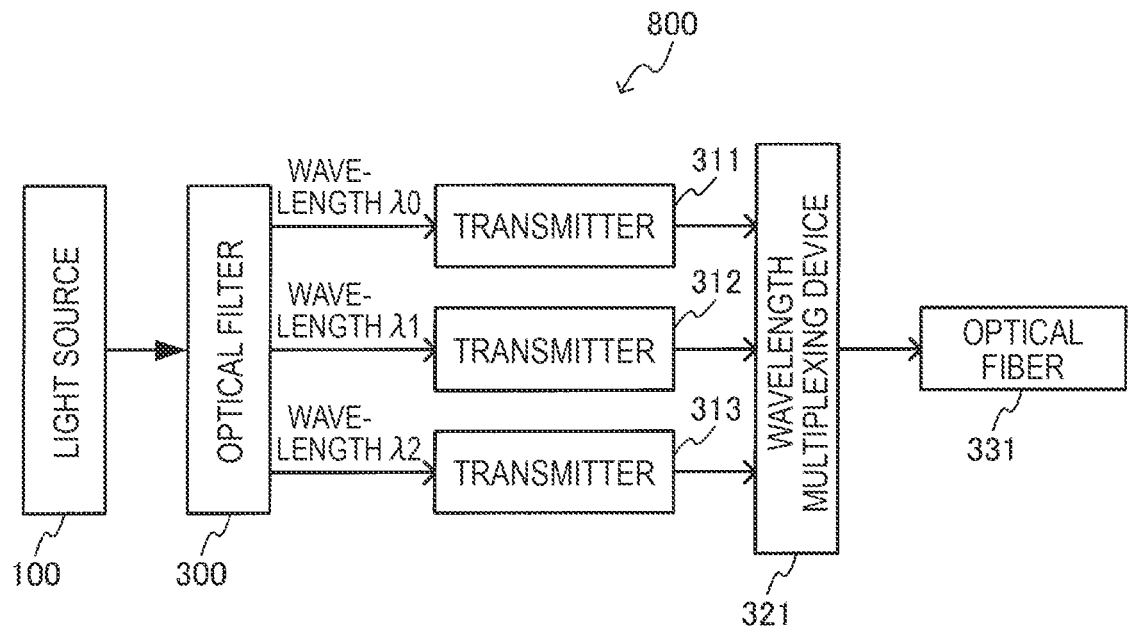
FIG. 9 is a block diagram showing the schematic configuration of a transmitter of a wavelength multiplexing communication system which is an example of an optical instrument.

FIG. 9 is a block diagram showing the schematic configuration of a transmitter of a wavelength multiplexing communication system which is an example of an optical instrument. In wavelength multiplexing (WDM: Wavelength Division Multiplexing) communication, from the characteristic that signals of different wavelengths do not interfere with each other, if a plurality of light signals of different wavelengths are multiply used in a single optical fiber, the amount of data transmission can be improved without increasing an optical fiber line.

In FIG. 9, a wavelength multiplexing transmitter 800 has an Etalon filter 300 on which light from a light source 100 is incident. Light of a plurality of wavelengths $\lambda 0, \lambda 1, \lambda 2, \ldots$ is transmitted from the Etalon filter 300 (including an Etalon element having one of the above-described mirror structures). Transmitters 311, 312, and 313 are provided by wavelength. Light pulse signals for a plurality of channels from the transmitters 311, 312, and 313 are adjusted to one signal by a wavelength multiplexing device 321 and sent to a single optical fiber transmission path 331.

The invention can also be applied to an optical code division multiplexing (OCDM) transmitter. This is because, while the OCDM identifies channels by pattern matching of encoded light pulse signals, light pulses which form the light pulse signals include light components of different wavelengths. As described above, if the invention is applied to an optical instrument, a reliable optical instrument (for example, various sensors or optical communication application instrument) in which deterioration in the characteristics of the optical films is suppressed is realized.

As described above, according to at least one of the embodiments of the invention, for example, it is possible to improve the degree of freedom in designing the optical films. For example, a small and convenient optical filter module is also realized. It is also possible to realize a small, lightweight, and convenient spectrometric instrument having a simplified configuration. A small, lightweight, and convenient optical instrument (for example, various sensors or optical communication application instrument) having a simplified configuration is also realized.

The invention is suitably applied to, for example, an optical filter, such as Etalon. However, the invention is not limited to this example, and the invention can be applied to all structures (elements or instrument) using a mirror, which includes a pair of optical films having a light-reflective characteristic and a light-transmissive characteristic, as a mirror structure.

Although the invention has been described with reference to the embodiments, those skilled in the art should readily understand that various modifications may be made without substantially departing from the novel matter and effects of the invention. Thus, those modifications also fall within the scope of the invention. For example, a term described at least once with a different term with a broader sense or the same meaning in the specification or the accompanying drawings can be replaced with the different term in any part of the specification or the accompanying drawings.

What is claimed is:

1. An optical filter that receives light through a plurality of variable wavelength bandpass filters responsible for respective wavelength bands,
    wherein the variable wavelength bandpass filters responsible for adjacent wavelength bands include a first variable wavelength bandpass filter that is responsible for a first wavelength band,
    a second variable wavelength bandpass filter that is responsible for a second wavelength band that is different from the first wavelength band,
    the first variable wavelength bandpass filter having a first optical film and a second optical film facing each other with asymmetrical reflective characteristics, and
    the second variable wavelength bandpass filter having a third optical film and a fourth optical film facing each other with symmetrical reflective characteristics.

2. The optical filter according to claim 1,
    wherein a thickness of the first optical film is different from a thickness of the second optical film, and
    when a first center wavelength of the first optical film is $\lambda 1$, a second center wavelength of the second optical film is $\lambda 2$, and a filter center wavelength in a spectral band of the optical filter is $\lambda 3$, $\lambda 1 < \lambda 3 < \lambda 2$ is established.

3. The optical filter according to claim 1,
    wherein a thickness of the first optical film is different from a thickness of the second optical film, and
    when a first minimum reflectance value of the first optical film in the spectral band of the optical filter is $\alpha 1$, and a second minimum reflectance value of the second optical film in the spectral band of the optical filter is $\alpha 2$, $\alpha 1 \cdot \lambda 2 \geq 0.64$ is established.

4. The optical filter according to claim 1,
    wherein a material which forms the first optical film is different from a material which forms the second optical film.

5. The optical filter according to claim 1,
    wherein the first optical film is configured by stacking a plurality of first layers, and the second optical film is configured by stacking a plurality of second layers, and
    each of the plurality of first layers has a first thickness, and each of the plurality of second layers has a second thickness that is different from the first thickness.

6. The optical filter according to claim 5,
    wherein a first stacking number of the plurality of first layers is different from a second stacking number of the plurality of second layers.

7. The optical filer according to claim 5,
wherein the each of the plurality of first layers of the first optical film is configured a first material film and a second material film that is different from the first material film,
the each of the plurality of second layers of the second optical film is configured with the first material film and the second material film, and
a first reflective index of the first material film is higher than a second reflective index of the second material film.

8. The optical filter according to claim 1,
wherein the optical filter is a variable gap Etalon filter,
the first substrate is a fixed substrate having a first electrode,
the second substrate is a movable substrate having a second electrode, and
a gap between the first optical film and the second optical film is variably controlled by electrostatic force which is generated between the first electrode and the second electrode, such that the spectral band is switched within a desired wavelength band.

9. The optical filter according to claim 8,
wherein the first electrode is formed around the first optical film in a plan view, and the second electrode is formed around the second optical film in the plan view.

10. The optical filter according to claim 8,
wherein a thickness of the second optical film provided on the second substrate serving as the movable substrate is smaller than a thickness of the first optical film provided on the first substrate serving as the fixed substrate.

11. An optical filter module comprising:
the optical filter according to claim 1; and
a light-receiving element which receives light having transmitted through the optical filter.

12. A spectrometric instrument comprising:
the optical filter according to claim 1;
a light-receiving element which receives light having transmitted through the optical filter; and
a signal processing unit which performs given signal processing on the basis of signal processing based on a signal obtained from the light-receiving element.

13. An optical instrument comprising:
the optical filter according to claim 1;
a light source to provide light to the optical filter; and
a light-receiving element which receives light having transmitted through the optical filter.

* * * * *